(12) United States Patent
Igarashi et al.

(10) Patent No.: US 7,940,692 B2
(45) Date of Patent: May 10, 2011

(54) WIRELESS COMMUNICATION TERMINAL AND WIRELESS COMMUNICATION METHOD

(75) Inventors: Kei Igarashi, Yokosuka (JP); Akira Yamada, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 932 days.

(21) Appl. No.: 11/841,342

(22) Filed: Aug. 20, 2007

(65) Prior Publication Data

US 2008/0043688 A1 Feb. 21, 2008

(30) Foreign Application Priority Data

Aug. 21, 2006 (JP) ................ 2006-224501
Jun. 4, 2007 (JP) ................ 2007-148491

(51) Int. Cl.
H04W 4/00 (2009.01)
H04L 12/26 (2006.01)
H04W 72/00 (2009.01)

(52) U.S. Cl. ... 370/253; 370/338; 370/349; 370/395.41; 455/453

(58) Field of Classification Search .......... 370/253, 370/338, 349, 395.4; 455/453
See application file for complete search history.

(56) References Cited

U.S. PATENT DOCUMENTS

| | | | | |
|---|---|---|---|---|
| 6,950,401 | B2 * | 9/2005 | Rong et al. | 370/252 |
| 6,996,104 | B2 * | 2/2006 | Trossen et al. | 370/390 |
| 7,174,180 | B2 * | 2/2007 | Andrews et al. | 455/512 |
| 7,317,693 | B1 * | 1/2008 | Roesch et al. | 370/252 |
| 7,574,720 | B1 * | 8/2009 | Yamazaki et al. | 725/50 |
| 7,675,893 | B2 * | 3/2010 | Takagi et al. | 370/338 |
| 7,817,614 | B2 * | 10/2010 | Yang et al. | 370/346 |
| 2004/0082364 | A1 * | 4/2004 | Kitazawa et al. | 455/560 |
| 2004/0196850 | A1 | 10/2004 | Ho | |
| 2005/0064817 | A1 | 3/2005 | Ginzburg | |
| 2007/0280175 | A1 * | 12/2007 | Cheng et al. | 370/338 |

FOREIGN PATENT DOCUMENTS

JP 2005-252627 9/2005

(Continued)

OTHER PUBLICATIONS

Takehiro Kawata, et al. "Using Dynamic PCF to Improve the Capacity for VoIP Traffic in IEEE 802.11 Networks", IEEE Communications Society/ WCNC 2005, pp. 1589-1595.

(Continued)

*Primary Examiner* — Alpus H Hsu
(74) *Attorney, Agent, or Firm* — Oblon, Spivak, McClelland, Maier & Neustadt, L.L.P.

(57) ABSTRACT

A wireless communication terminal comprises: a packet receiving unit for receiving a packet from a wireless base station; module for obtaining a transmission rate and a required transmission time from the received packet; module for calculating a time required to perform a packet transmission/reception procedure on the basis of the required transmission time; an analysis unit that functions as module for recognizing the existence of other terminal by decoding a destination MAC address described in the packet when the obtained transmission rate is equal to or lower than a transmission rate used by the wireless communication terminal; and a same-cell terminal list creation unit and band use time period scheduling unit for setting a band use time period that is equal to or greater than the time required to perform the packet transmission/reception procedure, for a time period, within a predetermined period corresponding to a packet generation period, regarding the other terminal and the wireless communication terminal, in order from the terminal having the lowest transmission rate.

13 Claims, 31 Drawing Sheets

FOREIGN PATENT DOCUMENTS

| | | |
|---|---|---|
| WO | WO 2005/062542 A1 | 7/2005 |
| WO | WO 2006/078494 A2 | 7/2006 |

OTHER PUBLICATIONS

"IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 7: Medium Access Control (MAC) Quality of Service (QoS) Enhancements, 4.9 GHz-5 GHz Operation in Japan", IEEE Standards 802.11j™, IEEE Computer Society, Oct. 29, 2004, 53 Pages.

"Information technology—Telecommunications and information exchange between systems—Local and metropolitan area networks—Specific requirements—Part 11: Wireless LAN Medium Access Control (MAC) and Physical Layer (PHY) Specifications", ANSI/IEEE Std 802.11, 1999, 528 Pages.

\* cited by examiner

Fig.5

| BAND USE TIME PERIOD(μs) | TRANSMISSION RATE (Mbps) | MAC ADDRESS |
|---|---|---|
| 2640 | 2 | xx:xx:07 |

*Fig.6*

| BAND USE TIME PERIOD($\mu$s) | TRANSMISSION RATE (Mbps) | MAC ADDRESS |
|---|---|---|
| 1440 | 5.5 | xx:xx:03 |
| 2640 | 2 | xx:xx:07 |
| 1440 | 5.5 | xx:xx:06 |

Fig.7

| BAND USE TIME PERIOD($\mu$s) | TRANSMISSION RATE (Mbps) | MAC ADDRESS |
|---|---|---|
| 1440 | 5.5 | xx:xx:03 |
| 2640 | 2 | xx:xx:07 |
| 1440 | 5.5 | xx:xx:06 |
| 1100 | 11 | xx:xx:02 |
| 1100 | 11 | xx:xx:01 |

*Fig.8*

| BAND USE TIME PERIOD START TIME($\mu$s) | MAC ADDRESS |
|---|---|
| 0 | xx:xx:07 |

*Fig.9*

| BAND USE TIME PERIOD START TIME($\mu$ s) | MAC ADDRESS |
|---|---|
| 0 | xx:xx:07 |
| 2640 | xx:xx:03 |
| 4080 | xx:xx:06 |

*Fig.10*

| BAND USE TIME PERIOD START TIME($\mu$s) | MAC ADDRESS |
|---|---|
| 0 | xx:xx:07 |
| 2640 | xx:xx:03 |
| 4080 | xx:xx:06 |
| 5520 | xx:xx:01 |
| 6620 | xx:xx:02 |

*Fig.14*

| BAND USE TIME PERIOD($\mu$s) | PACKET GENERATION PERIOD(Mbps) | MAC ADDRESS |
|---|---|---|
| 1100 | 20 | xx:xx:11 |
| 1100 | 20 | xx:xx:12 |
| 1100 | 20 | xx:xx:13 |
| 968 | 30 | xx:xx:14 |
| 968 | 30 | xx:xx:15 |

Fig.20

| BAND USE TIME PERIOD(μs) | PACKET GENERATION PERIOD (ms) | TRANSMISSION RATE (Mbps) | MAC ADDRESS |
|---|---|---|---|
| 1440 | 20 | 5.5 | xx:xx:26 |
| 1180 | 30 | 5.5 | xx:xx:27 |

Fig.21

| BAND USE TIME PERIOD($\mu$s) | PACKET GENERATION PERIOD (ms) | TRANSMISSION RATE (Mbps) | MAC ADDRESS |
|---|---|---|---|
| 1440 | 20 | 5.5 | xx:xx:26 |
| 968 | 30 | 11 | xx:xx:24 |
| 968 | 30 | 11 | xx:xx:25 |
| 1100 | 20 | 11 | xx:xx:23 |
| 1180 | 30 | 5.5 | xx:xx:27 |

*Fig.27*

| BAND USE TIME PERIOD($\mu$s) | MAC ADDRESS |
|---|---|
| 1440 1440 | xx:xx:33 xx:xx:37 |

Fig.28

| BAND USE TIME PERIOD($\mu$s) | MAC ADDRESS |
|---|---|
| 868<br>1440<br>868<br>1440 | xx:xx:31<br>xx:xx:33<br>xx:xx:36<br>xx:xx:37 |

*Fig.29*

| BAND USE TIME PERIOD START TIME($\mu$s) | MAC ADDRESS |
|---|---|
| 0<br>1440 | xx:xx:33<br>xx:xx:37 |

Fig.30

| BAND USE TIME PERIOD START TIME($\mu$s) | MAC ADDRESS |
|---|---|
| 0 | xx:xx:33 |
| 1440 | xx:xx:37 |
| 2880 | xx:xx:31 |
| 3748 | xx:xx:36 |

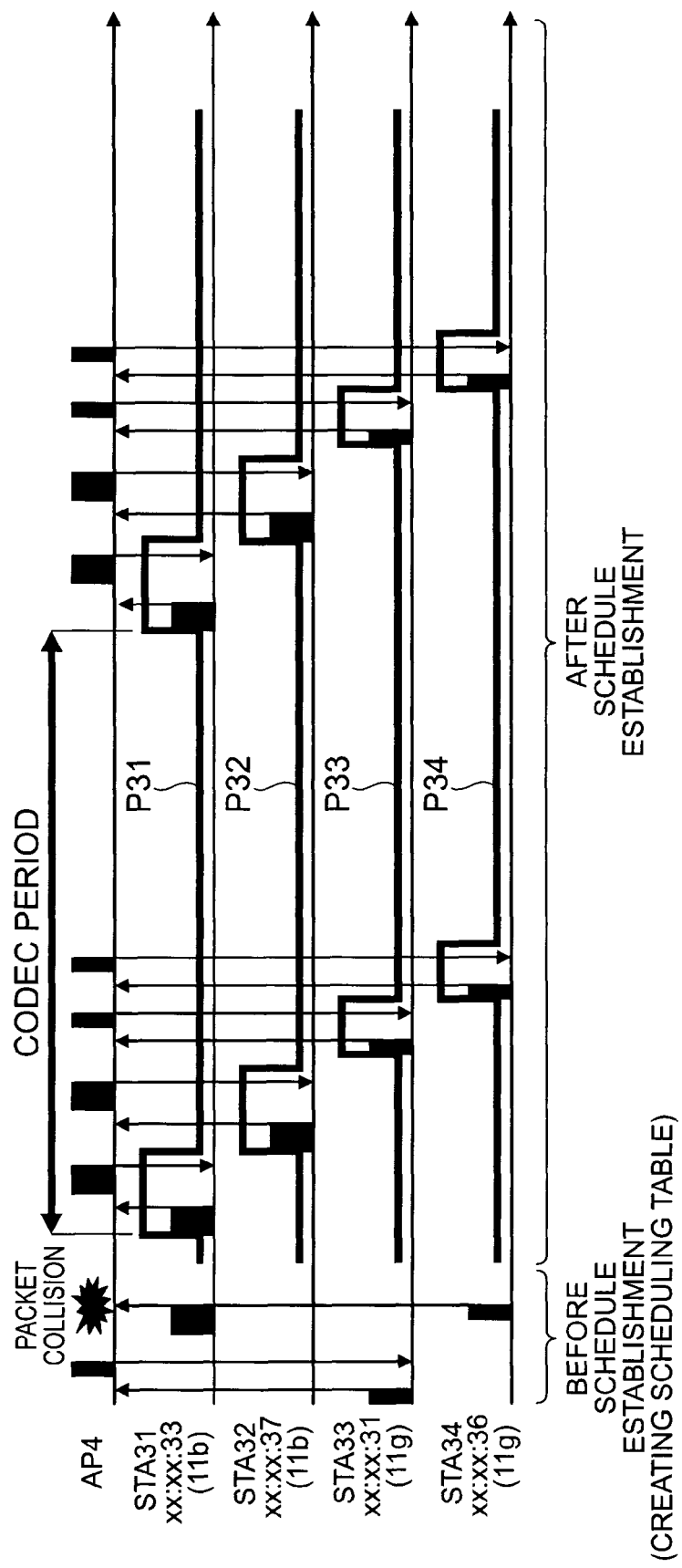

WIRELESS COMMUNICATION TERMINAL AND WIRELESS COMMUNICATION METHOD

BACKGROUND OF THE INVENTION

1. Field of the Invention

A present invention relates to a wireless LAN communication system, and more particularly to communication priority control in a CSMA/CA (Carrier Sense Multiple Access with Collision Avoidance) system.

2. Related Background Art

In a CSMA/CA system, a terminal performs virtual carrier sensing, to be described below, for a random time period prior to communication to check whether another terminal is communicating with a base station, and when another terminal is communicating, waits for the communication to end and then performs actual packet transmission. At this time, all terminals have equal transmission rights. In virtual carrier sensing, a random number is generated within a prescribed CW (Contention Window) range after a channel has been idle for an IFS (Inter Frame Space) time period, and a random time period is determined on the basis of the value of the random number. Back-off control, to be described below, is then performed during the random time period. In back-off control, the calculated random number value is set as an initial value, the value is reduced over time, and when the value reaches zero, actual packet transmission is performed. Here, IFS is a certain fixed time period prescribed by the wireless LAN standard IEEE802.11 for performing idle detection prior to transmission, and CW is the maximum random number value that can be obtained during back-off, which serves as a required parameter for realizing user-multiplexing. In IEEE802.11, a minimum value CWmin and a maximum value CWmax of CW are prescribed. Upon the initial transmission, back-off is performed by calculating a random number value using the value of CWmin, and upon every retransmission, CW is doubled. Note that CWmax is the upper limit value of CW. By means of this randomness-dependent back-off, communication can be performed with a plurality of terminals sharing an identical channel. However, with this system, a plurality of terminals may perform packet transmission simultaneously. When a plurality of terminals perform packet transmission simultaneously, a packet collision occurs such that none of the terminals can receive packets correctly, and as a result, the communication quality deteriorates. A particularly striking deterioration in the communication quality occurs in a real time application such as VoIP.

EDCA (Enhanced Distributed Channel Access), which is prescribed by IEEE802.11e and disclosed in the document "Part 11: Wireless LAN Medium Access Control (MAC) and Physical Layer (PHY) Specifications: Amendment 7: Medium Access Control (MAC) Quality of Service (QoS) Enhancements", exists as prior art relating to priority control in this type of communication system. In EDCA, four priority types are attached to packets, and parameters relating to the transmission wait time, such as the aforementioned IFS, CWmin, and CWmax, are set to be short with respect to high-priority packets. Thus, packet transmission rights are allocated preferentially. In so doing, relative priority control can be performed in a communication environment in which various applications, such as voice applications, data applications, and so on, coexist.

However, conventional EDCA is merely a technique for attaching an order of relative transmission precedence to a plurality of packets having different set priorities, and not for ensuring quality among and attaching priority to a plurality of terminals that transmit packets having the same set priority. Accordingly, packet collisions occurring when a plurality of terminals transmit packets having the same priority at the same time cannot be suppressed. When a packet collision occurs, retransmission is delayed even if successful, and when retransmission fails, packet loss occurs. Furthermore, when a plurality of terminals perform back-off to obtain packet transmission rights, another terminal from which the transmission rights are obtained faces an increased transmission wait time, or in other words a delay, to re-obtain transmission rights. The probability of a packet collision increases as the number of terminals rises, and the probability of delays and packet loss increases accordingly. A particularly great deterioration in quality may occur when delays and packet loss occur in a real time application such as VoIP (Voice over Internet Protocol).

In a different approach to avoiding packet collisions, a wireless base station for controlling terminals in which packets are generated periodically, as in VoIP, performs transmission timing scheduling on the terminals. In particular, Japanese Unexamined Patent Application Publication 2005-252627 describes a technique that enables scheduling to be performed when terminals having different packet generation periods coexist.

However, the technique described in Japanese Unexamined Patent Application Publication 2005-252627 is merely a method of having a wireless base station schedule the transmission timing of a wireless communication terminal, and the wireless communication terminal itself is not capable of scheduling the transmission timing in an autonomous distributed manner. Furthermore, although the technique described in Japanese Unexamined Patent Application Publication 2005-252627 is a protocol according to which scheduling can only be performed when the wireless base station recognizes the packet generation period of all of the wireless communication terminals, a method of ensuring that the wireless base station recognizes the packet generation period of all of the wireless communication terminals is not realized. Moreover, a method of allocating a specific transmission time period to each terminal within a predetermined scheduling period is not specified. Also, the transmission time period has a fixed length regardless of the terminal, and differences in the time required for each terminal to perform a transmission/reception procedure corresponding to varying transmission rates and packet lengths are not taken into account. Differences in the modulation system that can be supported by each terminal are not taken into account either.

SUMMARY OF THE INVENTION

The present invention has been designed to solve these problems, and it is an object thereof to ensure that a plurality of wireless communication terminals can determine an appropriate transmission timing in an autonomous distributed manner, even when the wireless communication terminals have different terminal properties (transmission rates, packet generation periods, and supportable modulation systems), in a case where an application that is required to transmit packets periodically, such as VoIP, is used on a wireless LAN.

A wireless communication terminal according to the present invention is provided in a wireless system in which periodically generated packets are transmitted and received between a single wireless base station and a plurality of wireless communication terminals at different transmission rates, and performs packet transmission based on a packet transmission system in which wireless band allocation is performed through virtual carrier sensing. The wireless communication terminal comprises: packet receiving module for receiving a packet from the wireless base station; first information obtaining module for analyzing the packet received by the packet receiving module, obtaining transmission rate information described in the packet, and obtaining required transmission time information required to transmit the packet, which is described in the packet; time calculating module for calculating a time required to perform a packet transmission/reception procedure on the basis of the required transmission time information obtained by the first information obtaining module; first other terminal recognizing module for determining whether or not the transmission rate obtained by the first information obtaining module is equal to or lower than a transmission rate used by the wireless communication terminal, and recognizing the existence of other terminal by decoding a destination MAC address described in the packet when the obtained transmission rate is equal to or lower than the transmission rate used by the wireless communication terminal; and first scheduling module for setting a band use time period that is equal to or greater than the calculated time required to perform the packet transmission/reception procedure, for a time period, within a predetermined period corresponding to a packet generation period, in which a band use time period has not yet been set, regarding the other terminal recognized by the first other terminal recognizing module and the wireless communication terminal, in order from the terminal having the lowest transmission rate. Thus, the wireless communication terminal is capable of realizing scheduling avoiding packet collisions in an autonomous distributed manner even when other wireless communication terminal having a different transmission rate exists.

Further, a wireless communication terminal according to the present invention is provided in a wireless system in which packets generated in different periods are transmitted and received between a single wireless base station and a plurality of wireless communication terminals, and performs packet transmission based on a packet transmission system in which wireless band allocation is performed through virtual carrier sensing. The wireless communication terminal comprises: packet receiving module for receiving a packet from the wireless base station; second information obtaining module for analyzing the packet received by the packet receiving module and obtaining required transmission time information required to transmit the packet, which is described in the packet; time calculating module for calculating a time required to perform a packet transmission/reception procedure on the basis of the required transmission time information obtained by the second information obtaining module; second other terminal recognizing module for recognizing the existence of other terminal by decoding a destination MAC address described in the packet; packet generation period estimating module for estimating a packet generation period of the other terminal recognized by the second other terminal recognizing module; and second scheduling module for (1) setting a common multiple of the packet generation period of the other terminal estimated by the packet generation period estimating module and a packet generation period of the wireless communication terminal, as a scheduling period, and (2) setting a band use time period that is equal to or greater than the calculated time required to perform the packet transmission/reception procedure, for a time period, within the scheduling period, in which a band use time period has not yet been set, regarding each of the other terminal and the wireless communication terminal. Thus, scheduling avoiding packet collisions can be realized in an autonomous distributed manner even when a wireless communication terminal having a different packet generation period exists.

The packet generation period estimating module is preferably configured to estimate the packet generation period of the other terminal by (1) receiving packets from the wireless base station for a predetermined amount of time, (2) decoding destination MAC addresses described in the received packets, and (3) observing the packet generation period of packets having an identical destination MAC address. Thus, even when VoIP terminals using unknown voice codecs coexist, the packet generation period of the VoIP terminals can be estimated without generating a new overhead that compresses the wireless band.

Further, the second information obtaining module is preferably configured to obtain transmission rate information described in the packet, and the packet generation period estimating module is preferably configured to hold in advance a table describing a relationship between (1) codec types and periods and (2) packet lengths when packets are generated using the codec, calculate a packet length on the basis of the required transmission time information and the transmission rate information obtained by the second information obtaining module, determine a codec period of the other terminal by referring to the table using the calculated packet length as a key, and estimate the packet generation period from the codec period. Thus, as long as one downward voice packet can be received from the wireless base station, the voice codec used by the destination terminal of the packet can be recognized, and as a result, the packet generation period of the destination terminal can be recognized without generating a new overhead that compresses the wireless band.

Further, the packet generation period estimating module is preferably configured to broadcast a packet describing a codec period used by the wireless communication terminal or the packet generation period of the wireless communication terminal, and estimate the packet generation period of the other terminal by receiving and decoding a packet broadcasted by the other terminal. Thus, even when terminals using unknown codecs coexist, the packet generation periods of the terminals can be recognized without observing a plurality of data packets over a fixed time period.

Further, a plurality of wireless communication terminals having an identical packet length are preferably grouped together, and packet generation period estimating module of only one predetermined wireless communication terminal within each group is preferably configured to broadcast the packet describing the codec period used by the wireless communication terminal or the packet generation period of the wireless communication terminal. Thus, even when terminals using unknown codecs coexist, the packet generation periods of the terminals can be recognized without observing a plurality of data packets over a fixed time period and so as to suppress the generation of new overheads that compress the wireless band to a minimum.

Further, the second scheduling module is preferably configured to group together terminals having an identical packet generation period from among the packet generation period of the other terminal estimated by the packet generation period estimating module and the packet generation period of the wireless communication terminal, set a temporary band use time period in order of MAC address for each terminal in each group, by setting the temporary band use time period of each terminal as to be longer than or equal to the time required to perform the packet transmission/reception procedure calculated by the time calculating module of each terminal, and set all of the temporary band use time periods in all of the groups as final band use time periods for all of the terminals in order from the temporary band use time period having the earliest start time, and when an attempt is made to set a temporary band use time period at a time in which another band use time period has already been set, set the temporary band use time period as a final band use time period at the end of the other band use time period. Thus, even when terminals having different packet generation periods coexist, transmission timing allocation can be performed so as to suppress fluctuation in the packet transmission interval of each terminal to a minimum.

A wireless communication terminal according to the present invention is provided in a wireless system in which packets generated in different periods are transmitted and received between a single wireless base station and a plurality of wireless communication terminals at different transmission rates, and performs packet transmission based on a packet transmission system in which wireless band allocation is performed through virtual carrier sensing. The wireless communication terminal comprises: packet receiving module for receiving a packet from the wireless base station; first information obtaining module for analyzing the packet received by the packet receiving module, obtaining transmission rate information described in the packet, and obtaining required transmission time information required to transmit the packet, which is described in the packet; time calculating module for calculating a time required to perform a packet transmission/reception procedure on the basis of the required transmission time information obtained by the first information obtaining module; first other terminal recognizing module for determining whether or not the transmission rate obtained by the first information obtaining module is equal to or lower than a transmission rate used by the wireless communication terminal, and recognizing the existence of other terminal by decoding a destination MAC address described in the packet when the obtained transmission rate is equal to or lower than the transmission rate used by the wireless communication terminal; packet generation period estimating module for estimating a packet generation period of the other terminal recognized by the first other terminal recognizing module; and third scheduling module for (1) setting a common multiple of the packet generation period of the other terminal estimated by the packet generation period estimating module and a packet generation period of the wireless communication terminal, as a scheduling period, and (2) setting a band use time period that is equal to or greater than the calculated time required to perform the packet transmission/reception procedure, for a time period, within the scheduling period, in which a band use time period has not yet been set, regarding each of the other terminal and the wireless communication terminal, in order from the terminal having the lowest transmission rate. Thus, scheduling avoiding packet collisions can be realized in an autonomous distributed manner even when wireless communication terminals having different transmission rates and different packet generation periods coexist.

A wireless communication terminal according to the present invention performs packet transmission based on a packet transmission system in which wireless band allocation is performed through virtual carrier sensing in a wireless system in which packets are transmitted and received between a single wireless base station and a plurality of wireless communication terminals, the plurality of wireless communication terminals including a first wireless communication terminal capable of supporting only a first modulation system and a second wireless communication terminal capable of supporting the first modulation system and a second modulation system which is different from the first modulation system. The wireless communication terminal comprises: packet receiving module for receiving a packet from the wireless base station; third information obtaining module for analyzing the packet received by the packet receiving module and obtaining required transmission time information required to transmit the packet which is described in the packet, when the packet is based on a modulation system that can be supported by the wireless communication terminal; time calculating module for calculating a time required to perform a packet transmission/reception procedure on the basis of the required transmission time information obtained by the third information obtaining module; third other terminal recognizing module for, when the received packet is based on the modulation system that can be supported by the wireless communication terminal and the received packet can be recognized, recognizing the existence of other terminal capable of supporting an identical modulation system to the modulation system that can be supported by the wireless communication terminal, by decoding a destination MAC address described in the packet; and fourth scheduling module for setting a band use time period that is equal to or greater than the calculated time required to perform the packet transmission/reception procedure, for a time period in which a band use time period has not yet been set, regarding the other terminal recognized by the third other terminal recognizing module and the wireless communication terminal, in order of the first wireless communication terminal and then the second wireless communication terminal. Thus, scheduling avoiding packet collisions can be realized in an autonomous distributed manner even when wireless communication terminals having different supportable modulation systems coexist.

Note that the inventions pertaining to the wireless communication terminal described above may be described as inventions pertaining to a wireless communication method, and in so doing, similar actions and effects are achieved.

A wireless communication method according to the present invention is executed by a wireless communication terminal provided in a wireless system in which periodically generated packets are transmitted and received between a single wireless base station and a plurality of wireless communication terminals at different transmission rates, the wireless communication terminal performing packet transmission based on a packet transmission system in which wireless band allocation is performed through virtual carrier sensing. The wireless communication method comprises: a packet receiving step in which packet receiving module receives a packet from the wireless base station; a first information obtaining step in which first information obtaining module analyzes the packet received in the packet receiving step, obtains transmission rate information described in the packet, and obtains required transmission time information required to transmit the packet, which is described in the packet; a time calculating step in which time calculating module calculates a time required to perform a packet transmission/reception procedure on the basis of the required transmission time information obtained in the first information obtaining step; a first other terminal recognizing step in which first other terminal recognizing module determines whether or not the transmission rate obtained in the first information obtaining step is equal to or lower than a transmission rate used by the wireless communication terminal, and recognizes the existence of other terminal by decoding a destination MAC address described in the packet when the obtained transmission rate is equal to or lower than the transmission rate used by the wireless communication terminal; and a first scheduling step in which first scheduling module sets a band use time period that is equal to or greater than the calculated time required to perform the packet transmission/reception procedure, for a time period, within a predetermined period corresponding to a packet generation period, in which a band use time period has not yet been set, regarding the other terminal recognized in the first other terminal recognizing step and the wireless communication terminal, in order from the terminal having the lowest transmission rate.

Further, a wireless communication method according to the present invention is executed by a wireless communication terminal provided in a wireless system in which packets generated in different periods are transmitted and received between a single wireless base station and a plurality of wireless communication terminals, the wireless communication terminal performing packet transmission based on a packet transmission system in which wireless band allocation is performed through virtual carrier sensing. The wireless communication method comprises: a packet receiving step in which packet receiving module receives a packet from the wireless base station; a second information obtaining step in which second information obtaining module analyzes the packet received in the packet receiving step and obtains required transmission time information required to transmit the packet, which is described in the packet; a time calculating step in which time calculating module calculates a time required to perform a packet transmission/reception procedure on the basis of the required transmission time information obtained in the second information obtaining step; a second other terminal recognizing step in which second other terminal recognizing module recognizes the existence of other terminal by decoding a destination MAC address described in the packet; a packet generation period estimating step in which packet generation period estimating module estimates a packet generation period of the other terminal recognized in the second other terminal recognizing step; and a second scheduling step in which second scheduling module (1) sets a common multiple of the packet generation period of the other terminal estimated in the packet generation period estimating step and a packet generation period of the wireless communication terminal, as a scheduling period, and (2) sets a band use time period that is equal to or greater than the calculated time required to perform the packet transmission/reception procedure, for a time period, within the scheduling period, in which a band use time period has not yet been set, regarding each of the other terminal and the wireless communication terminal.

Further, a wireless communication method according to the present invention is executed by a wireless communication terminal provided in a wireless system in which packets generated in different periods are transmitted and received between a single wireless base station and a plurality of wireless communication terminals at different transmission rates, the wireless communication terminal performing packet transmission based on a packet transmission system in which wireless band allocation is performed through virtual carrier sensing. The wireless communication method comprises: a packet receiving step in which packet receiving module receive a packet from the wireless base station; a first information obtaining step in which first information obtaining module analyzes the packet received in the packet receiving step, obtains transmission rate information described in the packet, and obtains required transmission time information required to transmit the packet, which is described in the packet; a time calculating step in which time calculating module calculates a time required to perform a packet transmission/reception procedure on the basis of the required transmission time information obtained in the first information obtaining step; a first other terminal recognizing step in which first other terminal recognizing module determines whether or not the transmission rate obtained in the first information obtaining step is equal to or lower than a transmission rate used by the wireless communication terminal, and recognizes the existence of other terminal by decoding a destination MAC address described in the packet when the obtained transmission rate is equal to or lower than the transmission rate used by the wireless communication terminal; a packet generation period estimating step in which packet generation period estimating module estimates a packet generation period of the other terminal recognized in the first other terminal recognizing step; and a third scheduling step in which third scheduling module (1) sets a common multiple of the packet generation period of the other terminal estimated in the packet generation period estimating step and a packet generation period of the wireless communication terminal, as a scheduling period, and (2) sets a band use time period that is equal to or greater than the calculated time required to perform the packet transmission/reception procedure, for a time period, within the scheduling period, in which a band use time period has not yet been set, regarding each of the other terminal and the wireless communication terminal, in order from the terminal having the lowest transmission rate.

Further, a wireless communication method according to the present invention is executed by a wireless communication terminal that performs packet transmission based on a packet transmission system in which wireless band allocation is performed through virtual carrier sensing in a wireless system in which packets are transmitted and received between a single wireless base station and a plurality of wireless communication terminals, the plurality of wireless communication terminals including a first wireless communication terminal capable of supporting only a first modulation system and a second wireless communication terminal capable of supporting the first modulation system and a second modulation system which is different to the first modulation system. The wireless communication method comprises: a packet receiving step in which packet receiving module receive a packet from the wireless base station; a third information obtaining step in which third information obtaining module analyzes the packet received in the packet receiving step and obtains required transmission time information required to transmit the packet which is described in the packet, when the packet is based on a modulation system that can be supported by the wireless communication terminal and the packet can be recognized; a time calculating step in which time calculating module calculates a time required to perform a packet transmission/reception procedure on the basis of the required transmission time information obtained in the third information obtaining step; a third other terminal recognizing step in which third other terminal recognizing module recognizes the existence of other terminal capable of supporting an identical modulation system to the modulation system that can be supported by the wireless communication terminal, by decoding a destination MAC address described in the received packet, when the packet is based on the modulation system that can be supported by the wireless communication terminal and the received packet can be recognized; and a fourth scheduling step in which fourth scheduling module sets a band use time period that is equal to or greater than the calculated time required to perform the packet transmission/reception procedure, for a time period in which a band use time period has not yet been set, regarding the other terminal recognized in the third other terminal recognizing step and the wireless communication terminal, in order of the first wireless communication terminal and then the second wireless communication terminal.

According to the present invention, in a case where an application that is required to transmit packets periodically, such as VoIP, is used on a wireless LAN, an appropriate transmission timing can be determined in a plurality of wireless communication terminals in an autonomous distributed manner even when the wireless communication terminals have different terminal properties (transmission rates, packet generation periods, and supportable modulation systems), and as a result, an improvement in communication quality can be achieved.

BRIEF DESCRIPTION OF THE DRAWINGS

FIG. 5 is a view showing a same-cell terminal list held by an STA1.

FIG. 6 is a view showing a same-cell terminal list held by STA2 and 3.

FIG. 7 is a view showing a same-cell terminal list held by STA4 and 5.

FIG. 8 is a view showing a scheduling table created by the STA1.

FIG. 9 is a view showing a scheduling table created by the STA2 and 3.

FIG. 10 is a view showing a scheduling table created by the STA4 and 5.

FIG. 14 is a view showing a same-cell terminal list created by each wireless communication terminal in the second embodiment.

FIG. 20 is a view showing a same-cell terminal list created by STA21 and 22.

FIG. 21 is a view showing a same-cell terminal list created by STA23, 24 and 25.

FIG. 27 is a view showing a same-cell terminal list held by STA31 and 32.

FIG. 28 is a view showing a same-cell terminal list held by STA33 and 34.

FIG. 29 is a view showing a scheduling table created by the STA31 and 32.

FIG. 30 is a view showing a scheduling table created by the STA33 and 34.

FIG. 31 is a view showing a sequence realized by the fourth embodiment.

DESCRIPTION OF THE PREFERRED EMBODIMENTS

In the following description, VoIP is used as an example of an application in which packets are generated periodically. Embodiments of a case in which the present invention is applied when VoIP is used on a wireless LAN will be described. The hardware configuration and function block configuration of a wireless communication terminal (also referred to as a "VoIP terminal") to which the present invention is applied are shown in FIGS. 1 and 2, respectively.

Figure 1:
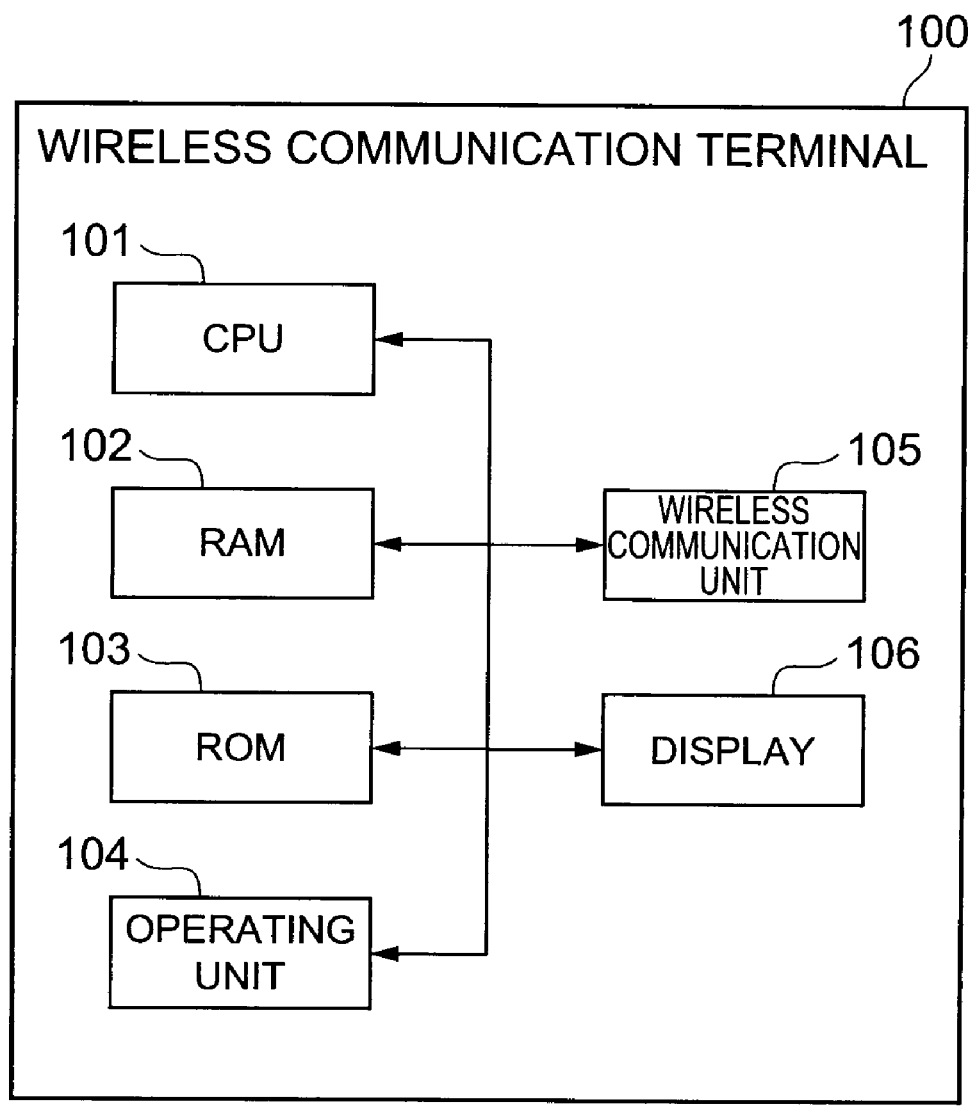
FIG. 1 is a view showing the hardware configuration of a wireless communication terminal to which the present invention is applied.

As shown in FIG. 1, a wireless communication terminal 100 comprises a CPU 101 for performing various types of information processing, a ROM 102, a RAM 103, an operating unit 104 such as buttons for inputting information, a wireless communication unit 105 for performing wireless communication using a CSMA/CA system, and a display 106.

Figure 2:
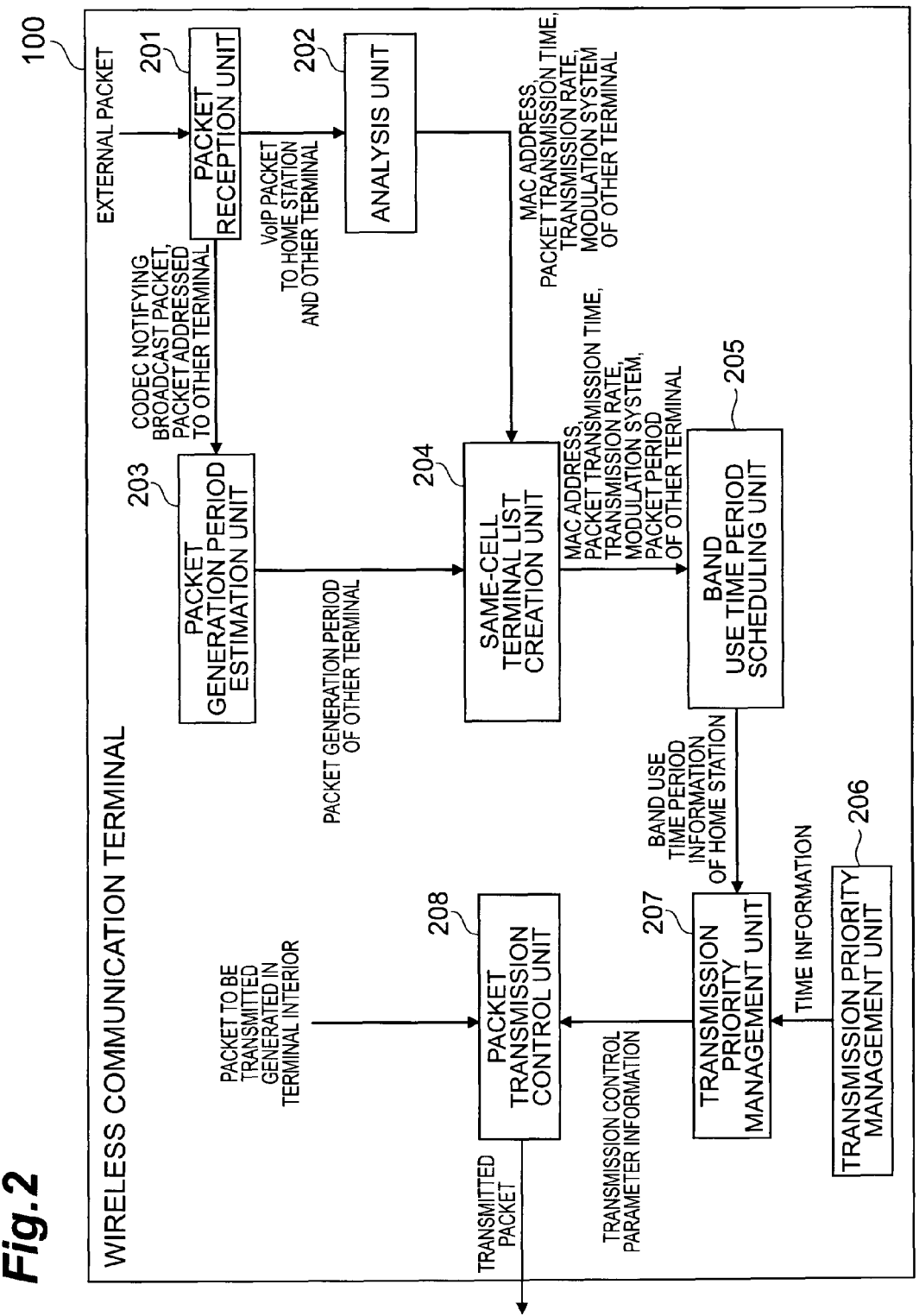
FIG. 2 is a view showing the function block configuration of the wireless communication terminal to which the present invention is applied.

As shown in FIG. 2, the wireless communication terminal 100 comprises a packet reception unit 201, an analysis unit 202, a packet generation period estimation unit 203, a same-cell terminal list creation unit 204, a band use time period scheduling unit 205, a transmission priority management unit 206, a time management unit 207, and a packet transmission control unit 208, all of which will be described below.

The packet reception unit 201 is packaged in the wireless communication unit 105 shown in FIG. 1. The packet reception unit 201 has a function for receiving a packet from another wireless communication terminal (also referred to as "the other terminal" hereafter) and an access point (referred to as "AP" hereafter). When the packet received by the packet reception unit 201 is a broadcast packet from the other terminal providing notification of an employed codec or a VoIP packet addressed to the other terminal, the packet reception unit 201 transmits the packet to the packet generation period estimation unit 203.

The analysis unit 202 is packaged in the wireless communication unit 105 shown in FIG. 1. The analysis unit 202 obtains the transmission rate of the packet received by its own wireless communication terminal 100 (also referred to as the "home station" hereafter), as well as the modulation system of the packet, the time required to transmit the packet, the MAC address of the packet transmission source, and the MAC address of the packet destination. When the transmission source MAC address matches the MAC address of the wireless base station with which the home station is communicating, the analysis unit 202 transmits the transmission rate, modulation system, time required to transmit the packet, and the transmission source MAC address of the packet to the same-cell terminal list creation unit 204.

The packet generation period estimation unit 203 is packaged in the CPU 101, ROM 102, and RAM 103 shown in FIG. 1. The packet generation period estimation unit 203 transmits packet generation period information of the other terminal, which is obtained through estimation processing described below, to the same-cell terminal list creation unit 204.

The same-cell terminal list creation unit 204 is packaged in the CPU 101, ROM 102, and RAM 103 shown in FIG. 1. The same-cell terminal list creation unit 204 transmits the MAC address, packet generation period, transmission rate, modulation system, and packet generation period information of the other terminal to the band use time period scheduling unit 205, and creates a same-cell terminal list such as those shown in FIGS. 5 to 7, to be described below.

The band use time period scheduling unit 205 is packaged in the CPU 101, ROM 102, and RAM 103. The band use time period scheduling unit 205 calculates a schedule for allocating a time period during which transmission rights can be obtained exclusively or preferentially to terminals existing within an identical cell. The band use time period scheduling unit 205 references the calculated schedule and transmits the band use time period information allocated to the home station, to the transmission priority management unit 206.

The time management unit 207 is a timer packaged in the wireless communication unit 105.

The transmission priority management unit 206 is packaged in the wireless communication unit 105. The transmission priority management unit 206 references current time information obtained from the time management unit 207 and the band use time period information of the home station, obtained from the band use time period scheduling unit 205, and transmits transmission parameter information to the packet transmission control unit 208.

The packet transmission control unit 208 is packaged in the wireless communication unit 105. The packet transmission control unit 208 performs actual packet transmission based on the transmission parameter information obtained from the transmission priority management unit 206.

Note that the packet reception unit 201 corresponds to packet reception module according to the present invention, and the packet generation period estimation unit 203 corresponds to packet generation period estimating module according to the present invention. The analysis unit 202 corresponds to first information obtaining module, second information obtaining module, time calculating module, and first through third other terminal recognizing module according to the present invention. The same-cell terminal list creation unit 204 and the band use time period scheduling unit 205 correspond to first through fourth scheduling module.

Below, wireless communication control processing in a wireless LAN network constituted by a plurality of wireless communication terminals configured as described above and an AP will be described in each of the four following cases. As a first embodiment, a case in which wireless communication terminals having different transmission rates coexist and all of the terminals use the same voice codec will be described. As a second embodiment, a case in which wireless communication terminals having different voice codecs coexist and all of the terminals use the same transmission rate will be described. As a third embodiment, a case in which wireless communication terminals having different transmission rates and different voice codecs coexist will be described. As a fourth embodiment, a case in which wireless communication terminals having different supportable modulation systems coexist will be described.

First Embodiment

First, as the first embodiment, a case in which wireless communication terminals having different transmission rates coexist and all of the terminals use the same voice codec will be described.

Figure 3:
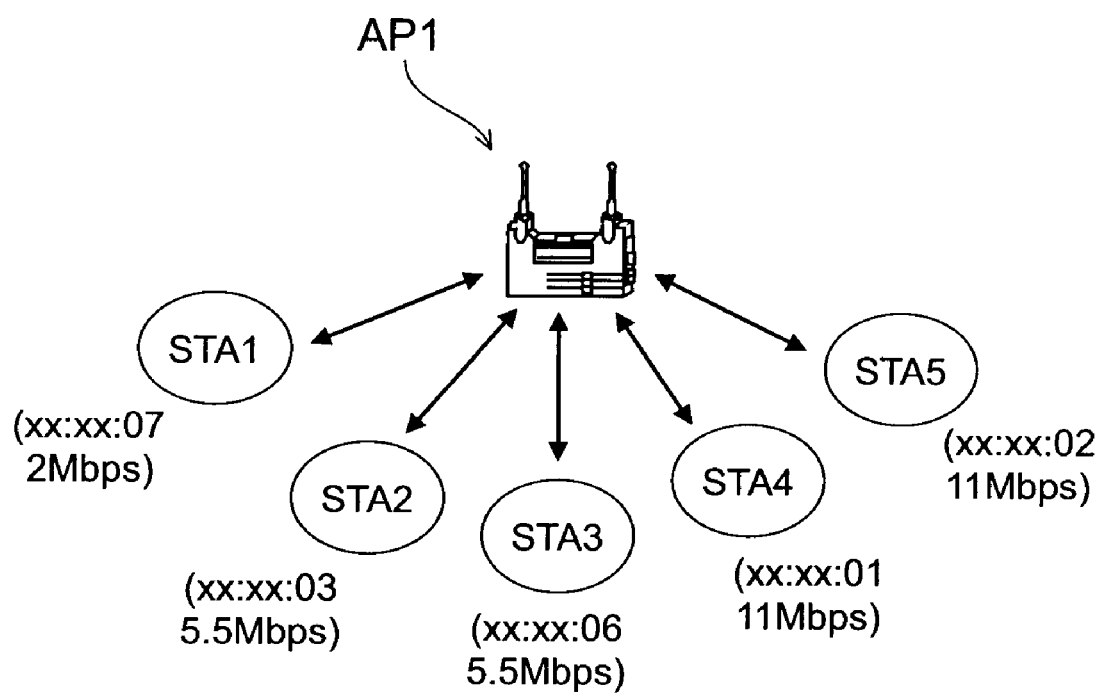
FIG. 3 is a view showing a network configuration of a first embodiment.

As shown in FIG. 3, a wireless LAN network is constituted by an AP1, serving as a single wireless base station, and a plurality of wireless communication terminals. Here, the plurality of wireless communication terminals are differentiated by the reference symbols STA1 to STA5. As shown in parentheses in FIG. 3, the MAC addresses and transmission rates of the respective wireless communication terminals are as follows: in the STA1, the MAC address is xx:xx:07 and the transmission rate is 2 Mbps; in the STA2, the MAC address is xx:xx:03 and the transmission rate is 5.5 Mbps; in the STA3, the MAC address is xx:xx:06 and the transmission rate is 5.5 Mbps; in the STA4, the MAC address is xx:xx:01 and the transmission rate is 11 Mbps; and in the STA5, the MAC address is xx:xx:02 and the transmission rate is 11 Mbps. Note that in FIG. 3, only five wireless communication terminals are illustrated, but the number of wireless communication terminals may take any appropriate value. Further, each wireless communication terminal has the hardware configuration shown in FIG. 1 and the function block configuration shown in FIG. 2.

The AP1 and each wireless communication terminal communicate in the short preamble mode of IEEE802.11b, and it is assumed that all of the wireless communication terminals perform VoIP communication using the voice codec G.711 and a codec period of 20 ms.

It is also assumed that the AP1 and each wireless communication terminal are packaged with IEEE802.11e EDCA and U-APSD (Unscheduled-Automatic Power Save Delivery). U-APSD is a protocol allowing the AP to transmit a downward packet to a wireless communication terminal upon reception of an upward packet from the terminal. Note that in this embodiment, the voice codec is G.711 and the codec period is 20 ms, but the type and period of the codec may be modified appropriately.

Figure 4:
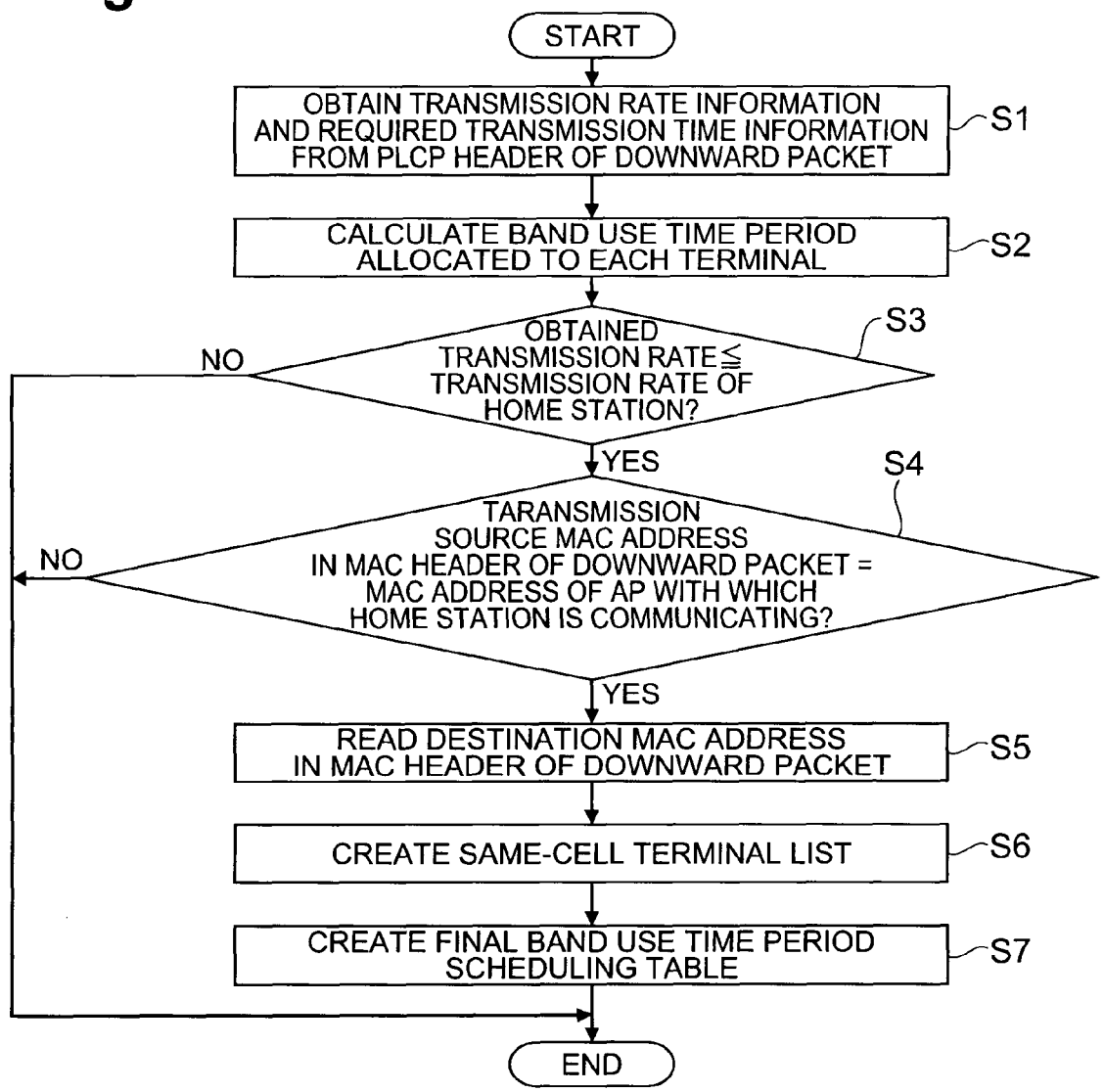
FIG. 4 is a flowchart of transmission scheduling processing, which is executed by each wireless communication terminal in the first embodiment.

An operation performed when each of the wireless communication terminals performs transmission scheduling in an autonomous distributed manner will now be described on the basis of FIG. 4. FIG. 4 shows a processing operation executed by each wireless communication terminal. Here, transmission scheduling is performed in 20 ms, i.e. the voice codec period. The reason for this is that the packet generation period is 20 ms, and therefore, by performing scheduling in 20 ms, the schedule may be repeated thereafter.

Each wireless communication terminal references a "SIGNAL" field and a "LENGTH" field in a PLCP header of a downward packet addressed to the home station and a downward packet addressed to another terminal (referred to as "the downward packet" hereafter) from the AP1, the "SIGNAL" field describing the transmission rate of the downward packet and the "LENGTH" field describing the required transmission time for transmitting packets from a MAC header onward, and as a result obtains transmission rate information and required transmission time information (step S1 in FIG. 4).

Next, each wireless communication terminal calculates the band use time period allocated to itself in the following manner (step S2). In other words, a value obtained by adding the short preamble (72 µs), the Ack transmission time, and the transmission wait time for CSMA/CA to the transmission/reception time described in the LENGTH field of the downward packet is calculated as the time required to perform a transmission/reception procedure between the wireless communication terminal and the AP per packet. The AP1 and wireless communication terminals of this embodiment are packaged with U-APSD, and therefore an upward packet transmission/reception procedure and a downward packet transmission/reception procedure can be performed continuously. Hence, the time required to perform a transmission/reception procedure between the wireless communication terminal and the AP for one reciprocation of an upward VoIP packet and a downward VoIP packet is calculated to be twice the time required to perform a transmission/reception procedure per packet.

Here, each wireless communication terminal determines whether or not the obtained transmission rate is equal to or less than the transmission rate used by itself (step S3), and terminates the processing when the obtained transmission rate is higher than its own transmission rate. The reason for this is that information from the MAC header onward cannot be read physically in packets having a higher transmission rate than the transmission rate of the home station.

When the obtained transmission rate is determined to be equal to or lower than the transmission rate of the home station in the step S3, each wireless communication terminal references the information in the MAC header of the downward packet, and determines whether or not the transmission source address in the MAC header of the downward packet is the same as the MAC address of the AP with which it is communicating (step S4). Here, the processing is terminated when the addresses are not the same, but when the addresses are determined to be the same, each wireless communication terminal reads the destination MAC address in the MAC header of the downward packet (step S5). Thus, using the MAC address as an identifier, a wireless communication terminal existing within the same cell can be recognized.

Then, on the basis of the information obtained in the recognition process described above, each wireless communication terminal creates a same-cell terminal list, which is a list of wireless communication terminals existing within the same cell (step S6). Note, however, that other terminals that communicate using a higher transmission rate than the transmission rate of the home station cannot be recognized, and therefore, in this embodiment, the same-cell terminal list held by the STA1 is as shown in FIG. 5, the same-cell terminal list held by the STA2 and 3 is as shown in FIG. 6, and the same-cell terminal list held by the STA4 and 5 is as shown in FIG. 7. Thus, the held same-cell terminal list differs according to the wireless communication terminal.

After creating the same-cell terminal list, each wireless communication terminal creates a final band use time period scheduling table by arranging the terminals in the same-cell terminal list in ascending order of the transmission rate and MAC address (step S7). In this embodiment, the scheduling table created by the STA1 is as shown in FIG. 8, the scheduling table created by the STA2 and 3 is as shown in FIG. 9, and the scheduling table created by the STA4 and 5 is as shown in FIG. 10. In the tables shown in FIGS. 8 to 10, the "band use start time" is a relative time notation having zero as the start time of a predetermined schedule period, and the band use start time is calculated from the band use time period noted in the terminal list. For example, the band use start time of the STA2 having the MAC address xx:xx:03 is calculated from the fact that the band use time period of the STA1 having the MAC address xx:xx:07 is 2640 µs. The band use start time of the STA3 having the MAC address xx:xx:06 is set after 1440 µs, which is the band use time period of the STA2, and is therefore calculated as 2640+1440=4080 µs.

Allocating the band use time period in order from the terminal having the lowest transmission rate in this manner has the following advantages. For example, in this embodiment, the STA1, which communicates at 2 Mbps, cannot recognize the number of terminals communicating at 5.5 Mbps and 11 Mbps. However, the terminals STA2, STA3, which communicate at 5.5 Mbps, can recognize the existence of the STA1, which communicates at 2 Mbps. Hence, by determining the convention of allocating the band use time period in order from the terminal having the lowest transmission rate in advance, the STA2 and the STA3 can set their own band use time period at the end of the band use time period set for the STA1. On the other hand, when an attempt is made to set the band use time periods in order from the terminal having the highest transmission rate, the 2 Mbps STA1 does not know the number of terminals communicating at 11 Mbps and 5.5 Mbps and cannot therefore calculate the start time of its own band use time period without overlapping the band use time period of another terminal.

Figure 11:
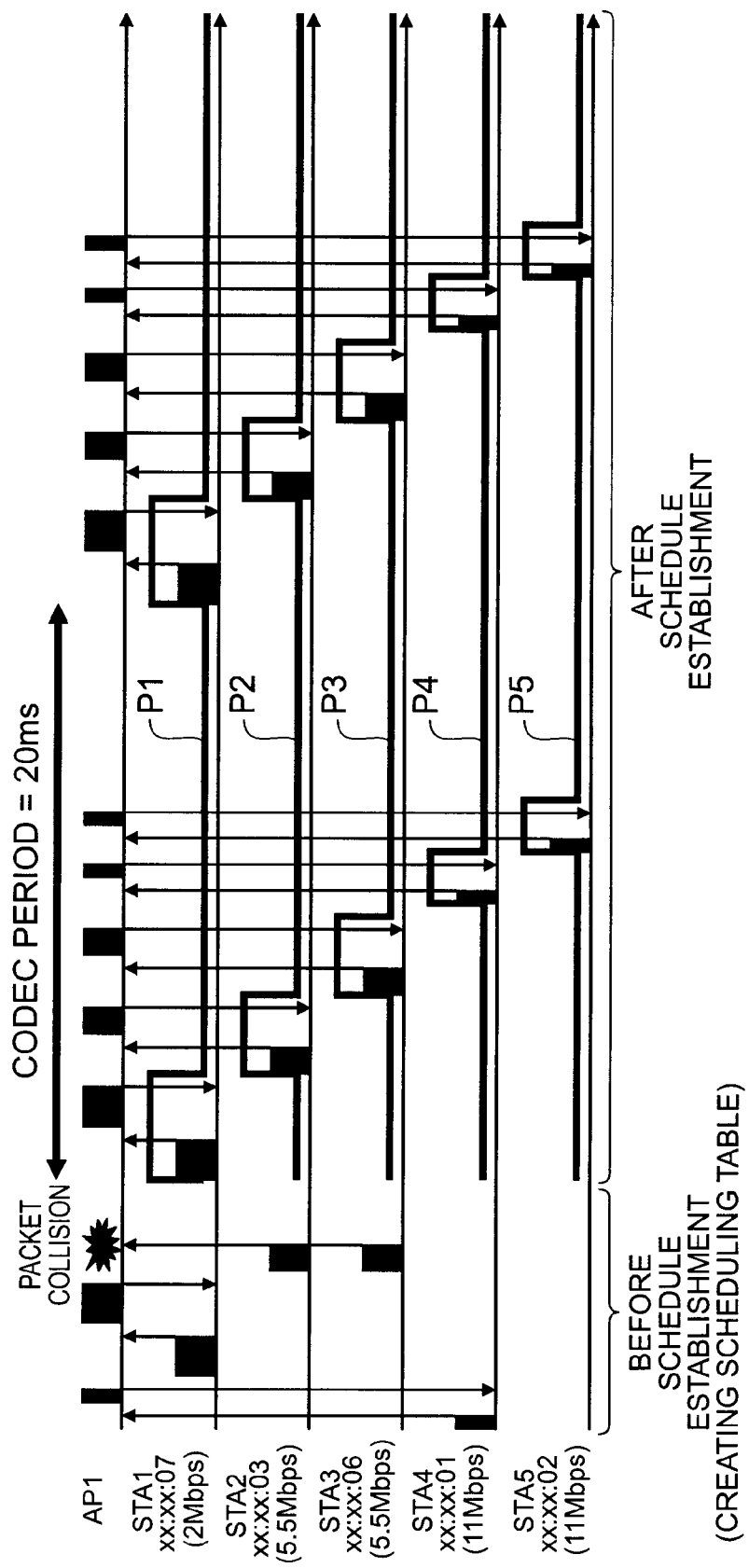
FIG. 11 is a view showing a sequence realized by the first embodiment.

By performing transmission scheduling in each wireless communication terminal in the manner described above, an organized sequence such as that shown in FIG. 11 can be realized. In addition to the sequence of packets transmitted and received between the wireless communication terminals and the AP, FIG. 11 shows transmission priorities, which vary chronologically in each terminal, on lines P1 to P5. In each terminal, the time period having an increased transmission priority (i.e. a high level) corresponds to the band use time period of the terminal. Thus, according to the first embodiment, a wireless communication terminal can realize scheduling avoiding packet collisions in an autonomous distributed manner even when another wireless communication terminal having a different transmission rate exists.

Second Embodiment

Next, as the second embodiment, a case in which wireless communication terminals having different voice codecs coexist and all of the terminals use the same transmission rate will be described.

Figure 12:
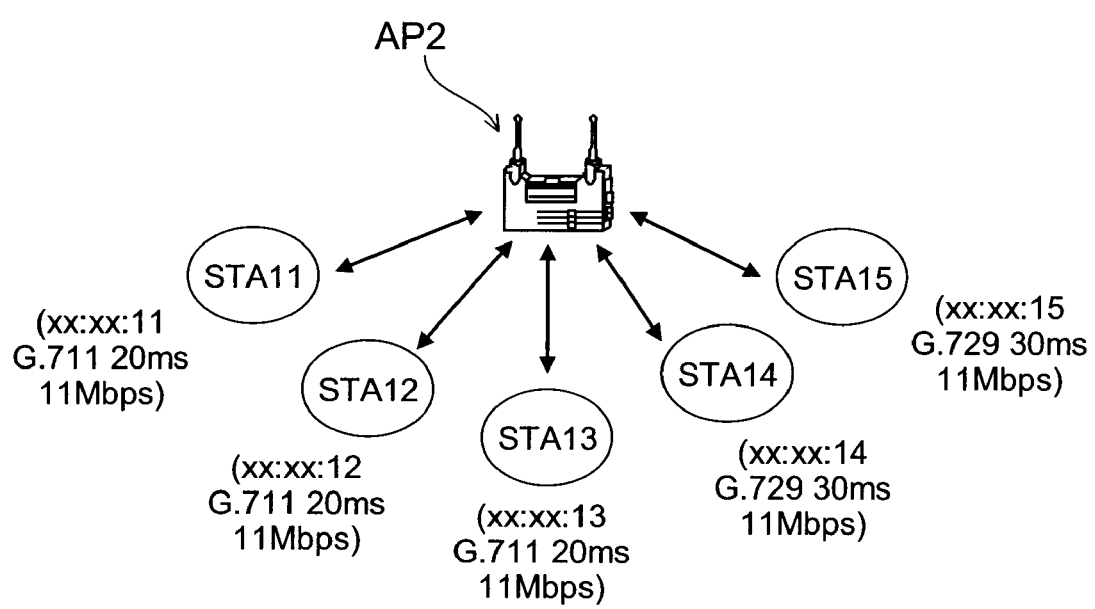
FIG. 12 is a view showing a network configuration of a second embodiment.

As shown in FIG. 12, a wireless LAN network is constituted by an AP2, serving as a single wireless base station, and a plurality of wireless communication terminals. Here, the plurality of wireless communication terminals are differentiated by the reference symbols STA11 to STA15. As shown in parentheses in FIG. 12, the MAC addresses and voice codecs of the respective wireless communication terminals are as follows: in the STA11, the MAC address is xx:xx:11 and the voice codec is G.711 with a period of 20 ms; in the STA12, the MAC address is xx:xx:12 and the voice codec is G.711 with a period of 20 ms; in the STA13, the MAC address is xx:xx:13 and the voice codec is G.711 with a period of 20 ms; in the STA14, the MAC address is xx:xx:14 and the voice codec is G.729 with a period of 30 ms; and in the STA15, the MAC address is xx:xx:15 and the voice codec is G.729 with a period of 30 ms. Note that in FIG. 12, only five wireless communication terminals are illustrated, but the number of wireless communication terminals may take any appropriate value. Further, each wireless communication terminal has the hardware configuration shown in FIG. 1 and the function block configuration shown in FIG. 2.

The AP2 and each wireless communication terminal communicate in the short preamble mode of IEEE802.11b, and it is assumed that all of the wireless communication terminals perform VoIP communication at a transmission rate of 11 Mbps.

It is also assumed that the AP2 and each wireless communication terminal are packaged with IEEE802.11e EDCA and the aforementioned U-APSD. Note that in this embodiment, the transmission rate is 11 Mbps, but the transmission rate may take any other appropriate value.

Figure 13:
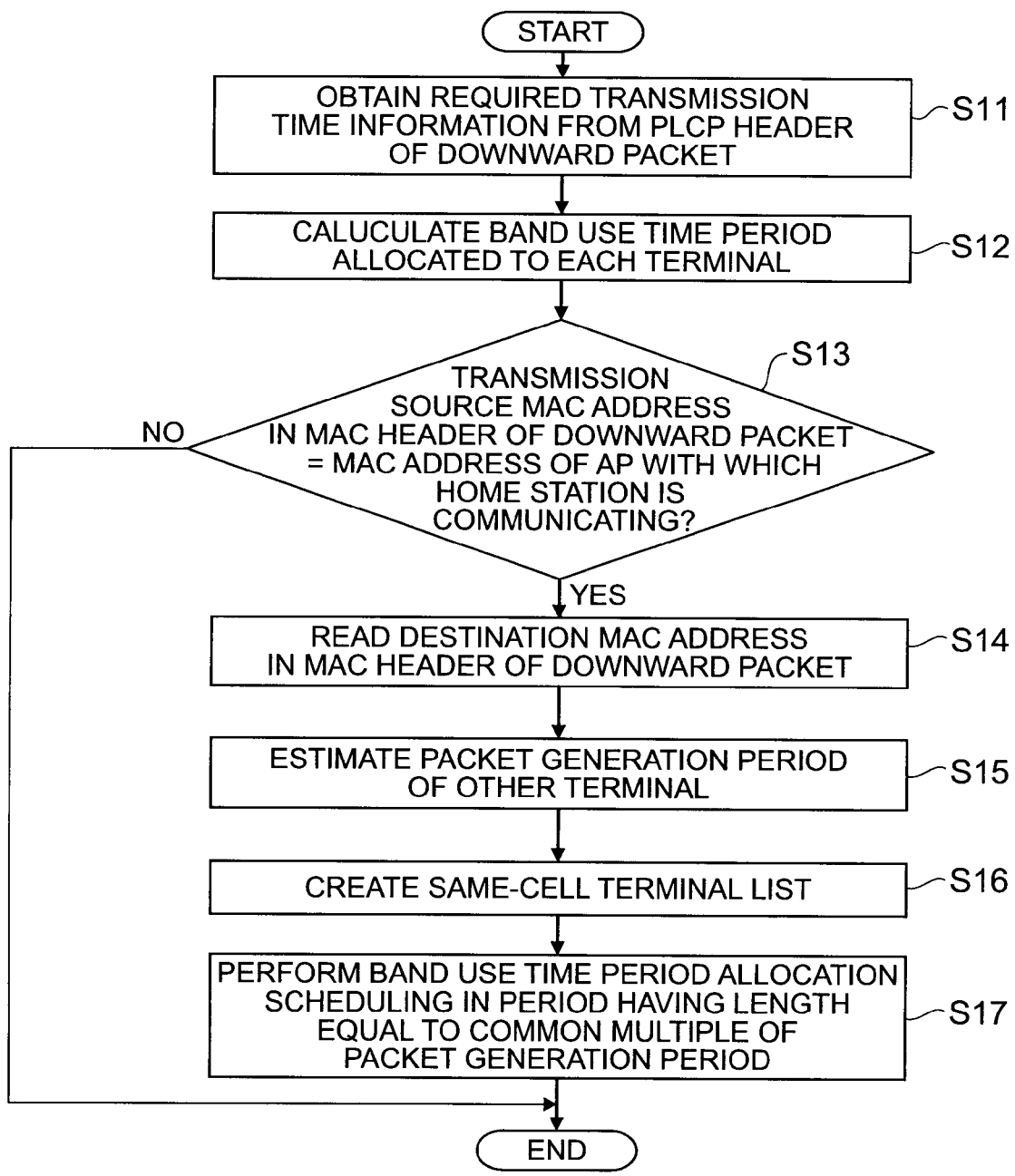
FIG. 13 is a flowchart of transmission scheduling processing, which is executed by each wireless communication terminal in the second embodiment.

An operation performed when each of the wireless communication terminals performs transmission scheduling in an autonomous distributed manner will now be described on the basis of FIG. 13. FIG. 13 shows a processing operation executed by each wireless communication terminal.

Each wireless communication terminal references the "LENGTH" field in the PLCP header of a downward packet addressed to the home station and a downward packet addressed to another terminal (referred to as "the downward packet" hereafter) from the AP2, and as a result obtains the required transmission time information (step S11 in FIG. 13).

Next, each wireless communication terminal calculates the band use time period allocated to itself in the following manner (step S12). In other words, a value obtained by adding the short preamble (72 μs), the Ack transmission time, and the transmission wait time for CSMA/CA to the transmission/reception time described in the LENGTH field of the downward packet is calculated as the time required to perform a transmission/reception procedure between the wireless communication terminal and the AP per packet. The AP2 and wireless communication terminals of this embodiment are packaged with U-APSD, and therefore an upward packet transmission/reception procedure and a downward packet transmission/reception procedure can be performed continuously. Hence, the time required to perform a transmission/reception procedure between the wireless communication terminal and the AP for one reciprocation of an upward VoIP packet and a downward VoIP packet is calculated to be twice the time required to perform a transmission/reception procedure per packet.

Here, each wireless communication terminal references the information in the MAC header of the downward packet, and determines whether or not the transmission source address in the MAC header of the downward packet is the same as the MAC address of the AP with which it is communicating (step S13). Here, the processing is terminated when it is determined that the addresses are not the same, but when the addresses are determined to be the same, each wireless communication terminal reads the destination MAC address in the MAC header of the downward packet (step S14). Thus, using the MAC address as an identifier, a wireless communication terminal existing within the same cell can be recognized.

Next, each wireless communication terminal estimates the packet generation period of the other terminals in the following manner (step S15). In VoIP, which is used in this embodiment, the packet generation period is equal to the codec period. However, the codec type and codec period are not described in a voice packet that is exchanged between the AP2 and the wireless communication terminal, and therefore, to recognize the codec period of another terminal, the codec period of the other terminal must be estimated. Three possible estimation methods will be described below.

Firstly, the codec period of the other terminal may be estimated by observing packets exchanged between the AP2 and the other terminal for a certain time period. For example, the STA14, which has a codec period of 30 ms, may assume the existence of a terminal that transmits and receives packets in a 20 ms period by continually receiving a plurality of packets that are transmitted and received between the other terminal and the AP2. Thus, the STA14 can assume that a terminal having a codec period of 20 ms exists in addition to a terminal that transmits and receives at 30 ms, such as itself.

Secondly, a downward packet transmitted from the AP2 to the other terminal may be received, and the codec period of the other terminal may be estimated on the basis of the packet length of the packet. For example, it is assumed that the STA14 having a codec period of 30 ms receives a downward packet addressed to the STA11 from the AP2. At this time, the STA14 references the SIGNAL field describing the transmission rate of the packet and the "LENGTH" field describing the required transmission time for transmitting packets from the MAC header onward in the PLCP header of the downward packet, and thus obtains transmission rate information and required transmission time information. Then, by multiplying the transmission rate by the required transmission time, the STA14 can determine the packet length. It is therefore assumed that the STA14 calculates the length of packets from the AP2 to the STA11 from the MAC header onward to be 1888 [bit]. If the STA14 holds information indicating that the packet length is 1888 [bit] when the codec period of the voice codec G.711 is 20 ms in advance, then the STA14 may assume that a terminal having a codec period of 20 ms exists.

Thirdly, the codec period of the other terminal may be estimated using a packet generation period notifying broadcast. For example, the STA11 transmits a broadcast packet indicating that its codec period is 20 ms. The transmitted broadcast packet is transmitted to all of the other wireless communication terminals, and therefore the other terminals can recognize that the STA11 is using a codec period of 20 ms upon reception of the broadcast packet. In other words, in this case the codec period of the other terminals can be recognized rather than estimated. Note that in this case, the broadcast packet for providing notification of the codec period need not be transmitted to all terminals. For example, a group comprising the STA11, 12 and 13 and a group comprising the STA14 and 15 each use an identical codec, and therefore the packet length that can be recognized from the LENGTH field in the PLCP header is equal. When terminals having the same packet length exist, the broadcast packet need only be transmitted by one of the terminals in the group (for example, only the terminal having the smallest MAC address), for example. The one terminal in the group may be any appropriate terminal within the group. For example, the STA15 can recognize that the STA11 has a 20 ms period by receiving a broadcast packet for providing codec period notification from the STA11, and at the same time, the STA15 can recognize that the STA12, 13, which have an equal packet length to the STA11, also have a 20 ms period, similarly to the STA11. Note that here, the fact that the STA11, 12, 13 have an equal packet length can be recognized from the LENGTH field information in the PLCP header of the downward packet from the AP2, as described above. Since the broadcast packet need not be transmitted by all of the terminals, compression of the wireless band caused by transmission and reception of the broadcast packet can be suppressed.

After estimating the packet generation period in the manner described above, each wireless communication terminal creates a same-cell terminal list such as that shown in FIG. 14 (step S16).

Each wireless communication terminal then performs band use time period allocation scheduling in a period having a length equal to the common multiple of the packet generation period of each terminal (step S17). In this embodiment, terminals having a packet generation period of 20 ms coexist with terminals having a packet generation period of 30 ms, and therefore scheduling is performed in a period having a length equal to the common multiple of 20 ms and 30 ms, i.e. 60 ms. Accordingly, in a scheduling period of 60 ms, three band use time periods are allocated to the 20 ms terminals (60 ms/20 ms=3) and two band use time periods are allocated to the 30 ms terminals (60 ms/30 ms=2). Hence, the number of allocated band use time periods differs according to the terminal, and therefore the band use time period cannot be allocated simply in order of the MAC address. Moreover, the band use time period must be allocated to terminals having a codec period of 20 ms at intervals as close to 20 ms as possible and to terminals having a codec period of 30 ms at intervals as close to 30 ms as possible. The reason for this is that in a real time application such as a voice application, delay fluctuation greatly affects quality.

A method of allocating a band use time period to each terminal will be described below. Band use time period allocation scheduling to each terminal will be described using FIG. 15, and an allocation procedure performed by each terminal at this time will be described using FIG. 16.

Figure 15:
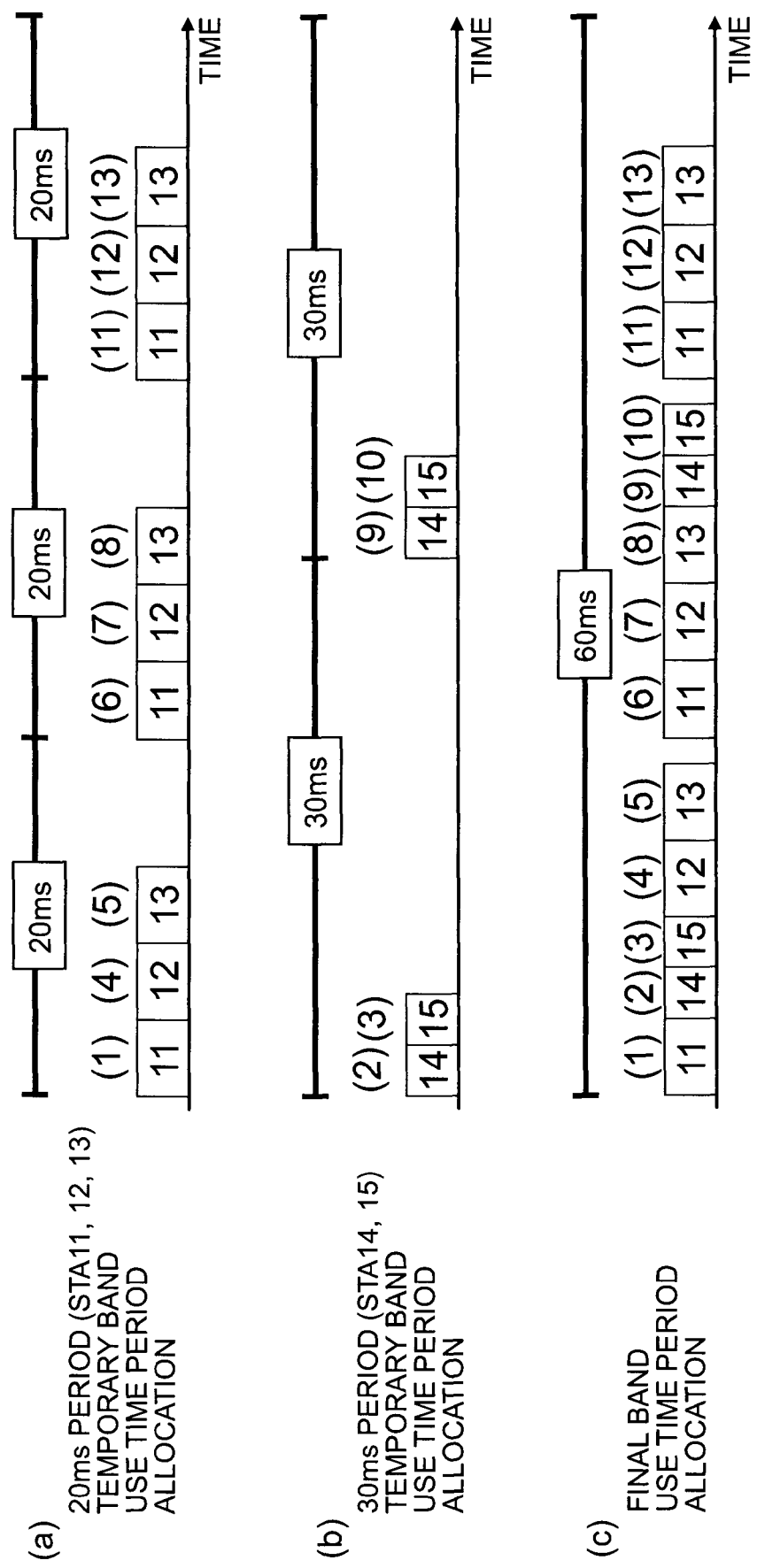
FIG. 15 is a view showing band use time period allocation scheduling with respect to each wireless communication terminal in the second embodiment.

First, each wireless communication terminal groups the terminals in the same-cell terminal list into terminals having the same codec period (step S21 in FIG. 16), and then allocates temporary band use time periods to the terminals in the group in ascending order of the MAC address (step S22). Note that here, allocation is performed within the group in ascending order of the MAC address, but any other appropriate method may be used. Further, at this time the scheduling time period is set at 60 ms, which is the common multiple of the packet generation periods 20 ms and 30 ms, and the temporary band use time period allocated to each wireless communication terminal is set as the codec period interval. In so doing, the temporary band use time period allocation scheduling for the group comprising the STA11, 12 and 13 is expressed as shown in (a) of FIG. 15, and the temporary band use time period allocation scheduling for the group comprising the STA14 and 15 is expressed as shown in (b) of FIG. 15. The temporary band use time period allocation scheduling shown in (a) and (b) of FIG. 15 is ideal scheduling in which the band use time periods are set such that delay fluctuation does not occur relative to the packet generation period.

In actuality, however, the two groups described above coexist, and therefore the band use time periods may overlap between the groups such that two or more band use time periods are set at an identical time.

Hence, the temporary band use time period allocation scheduling must be shifted to final band use time period allocation scheduling to ensure that delay fluctuation in each wireless communication terminal occurs as impartially as possible and as little as possible. For this purpose, each wireless communication terminal performs final scheduling in the following manner.

An allocation number (1), (2), . . . (n) is attached to each wireless communication terminal in order from the band use time period having the earliest start time in (a) and (b) of FIG. 15 (step S23 in FIG. 16). The numbers shown in parentheses in FIG. 15 correspond to the allocation numbers.

The temporary band use time periods are then set to final band use time periods in order of allocation number in the following manner. First, a variable i is set to "1", which serves as an initial value (step S24). An attempt is then made to set the temporary band use time period having the allocation number (i) (referred to as "temporary band use time period (i)" hereafter) as a final band use time period (step S25). Here, a determination is made as to whether or not another final band use time period has already been set at the time of the temporary band use time period (i) (step S26).

When another final band use time period has already been set at the time of the temporary band use time period (i), the temporary band use time period (i) is set as a final band use time period at the end of the other band use time period that has already been set (step S27).

On the other hand, when another final band use time period has not yet been set at the time of the temporary band use time period (i) in the step S26, the temporary band use time period (i) is set without modification as the final band use time period (step S28).

The variable i is then incremented by 1 (step S29), whereupon the processing of the steps S25 to S29 is executed repeatedly on each temporary band use time period in order of allocation number until it is determined that the variable i has exceeded the tail end n of all of the allocation numbers.

More specifically, first, since the variable i is 1, the processing of the steps S25 to S29 is executed on the temporary band use time period having the allocation number (1). A negative determination is obtained initially in the step S26, and therefore, in the step S28, the temporary band use time period having the allocation number (1) is set without modification as the final band use time period, as shown in FIG. 15.

Next, as shown in FIG. 15, the band use time period having the allocation number (1) has already been set at the same time as the temporary band use time period having the allocation number (2). Accordingly, an affirmative determination is obtained in the step S26, and in the step S27, the temporary band use time period having the allocation number (2) is set at the end of the band use time period having the allocation number (1). Thereafter, the processing of the steps S25 to S29 is executed in a similar sequence in relation to the temporary band use time periods having the allocation number (3) onward. When the processing has been performed on the band use time periods for all of the allocation numbers (i), an affirmative determination is obtained in the step S30, and therefore the processing of FIG. 16 is terminated.

Figure 16:
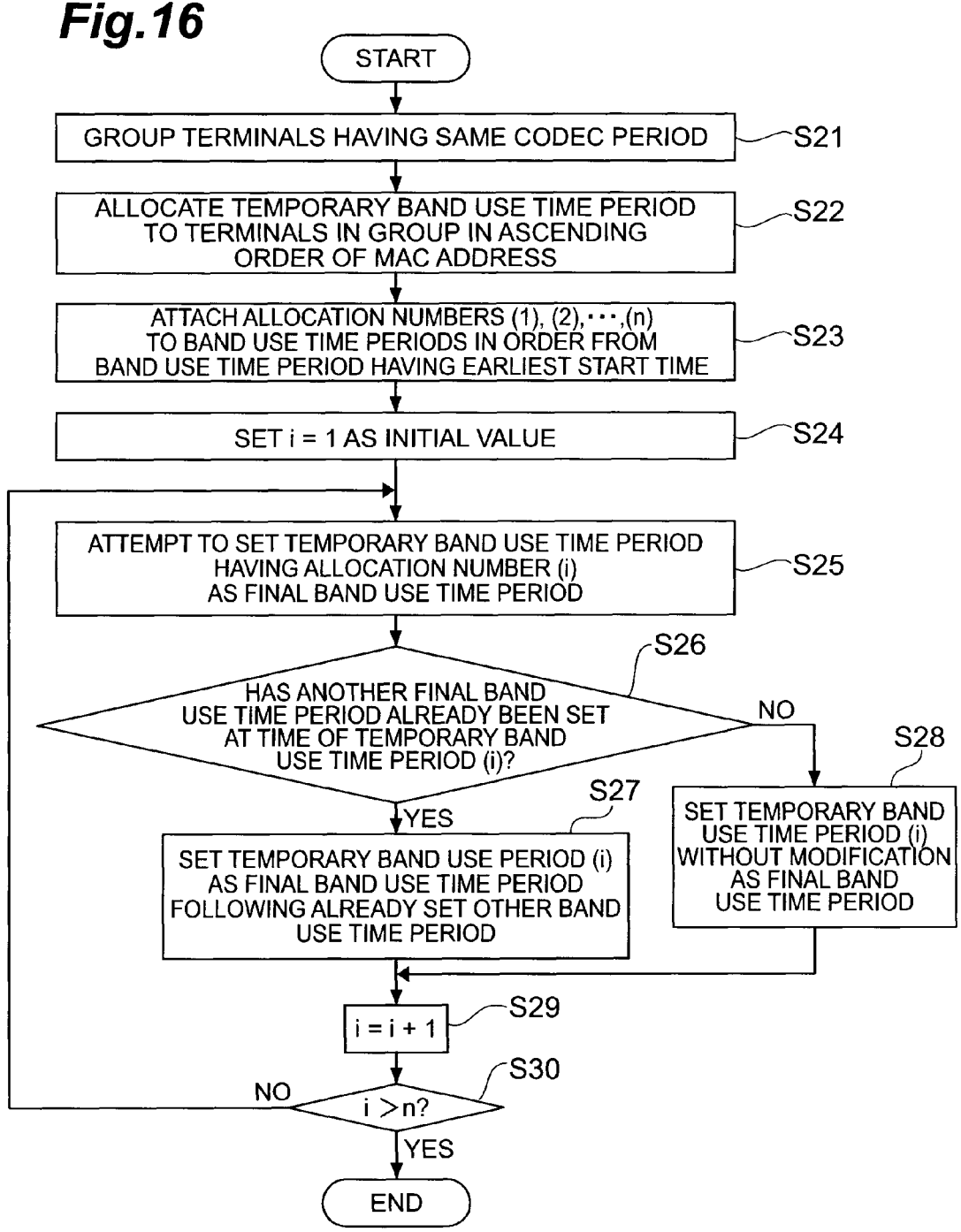
FIG. 16 is a view showing an allocation procedure performed by each wireless communication terminal in the second embodiment.

By means of the processing shown in FIG. 16 and described above, a final schedule in which delay fluctuation is suppressed to the smallest amount possible, such as that shown in (c) of FIG. 15, can be set in an environment in which terminals having different codec periods coexist.

Figure 17:
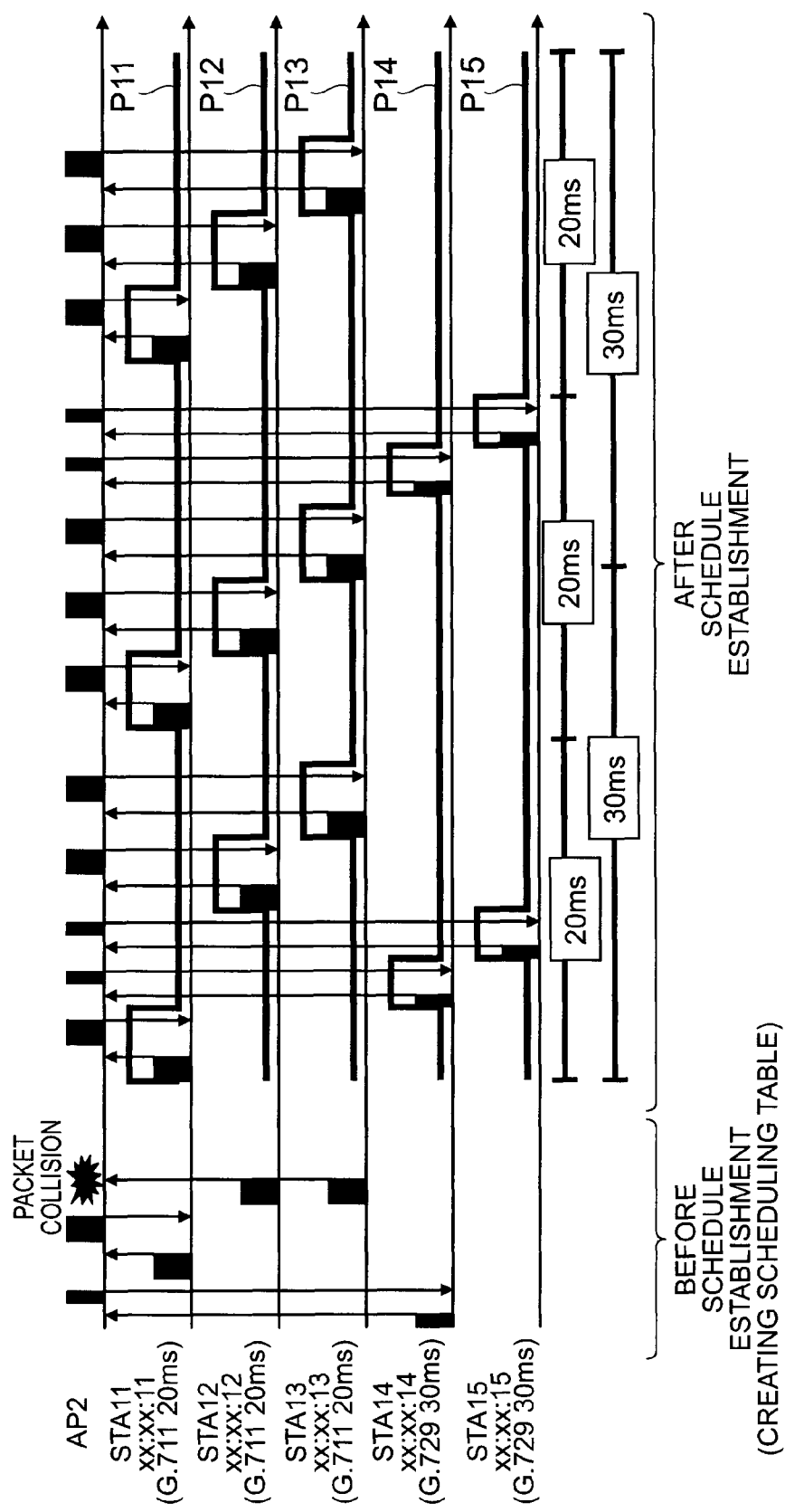
FIG. 17 is a view showing a sequence realized by the second embodiment.

By performing the transmission scheduling described above in each wireless communication terminal, an organized sequence such as that shown in FIG. 17 can be realized. In addition to the sequence of packets transmitted and received between the wireless communication terminals and the AP, FIG. 17 shows transmission priorities, which vary chronologically in each terminal, on lines P11 to P15. In each terminal, the time period having an increased transmission priority (i.e. a high level) corresponds to the band use time period of the terminal. Thus, according to the second embodiment, scheduling avoiding packet collisions can be realized in an autonomous distributed manner even when wireless communication terminals having different packet generation periods coexist.

Third Embodiment

Next, as the third embodiment, a case in which wireless communication terminals having different transmission rates and different voice codecs coexist will be described.

Figure 18:
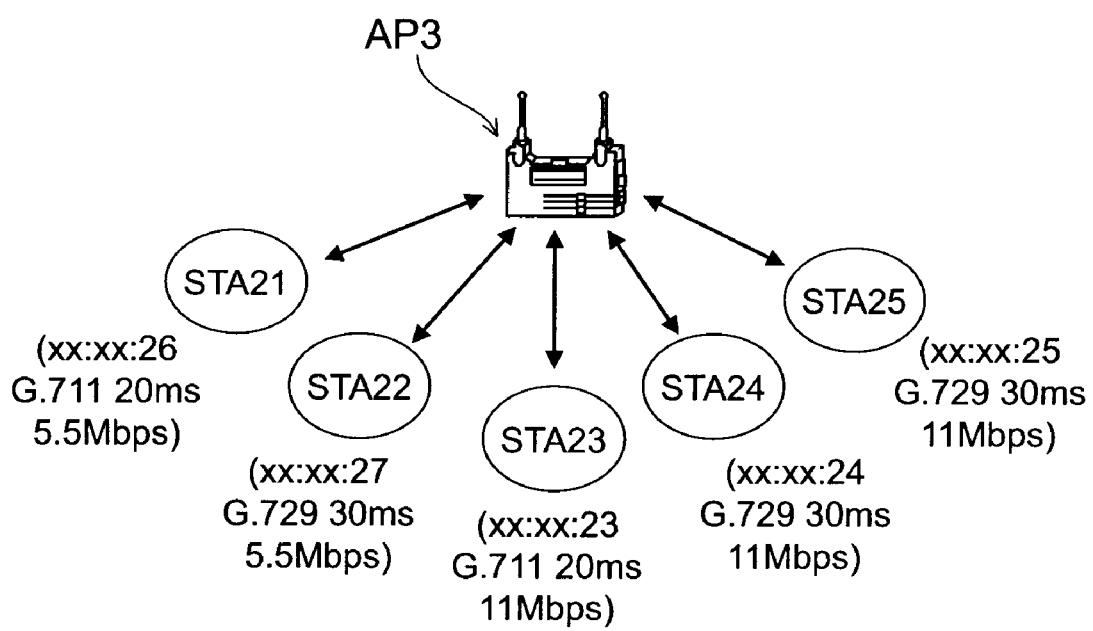
FIG. 18 is a view showing a network configuration of a third embodiment.

As shown in FIG. 18, a wireless LAN network is constituted by an AP3, serving as a single wireless base station, and a plurality of wireless communication terminals. Here, the plurality of wireless communication terminals are differentiated by the reference symbols STA21 to STA25. As shown in parentheses in FIG. 18, the MAC addresses, transmission rates, and voice codecs of the respective wireless communication terminals are as follows: in the STA21, the MAC address is xx:xx:26, the voice codec is G.711 with a period of 20 ms, and the transmission rate is 5.5 Mbps; in the STA22, the MAC address is xx:xx:27, the voice codec is G.729 with a period of 30 ms, and the transmission rate is 5.5 Mbps; in the STA23, the MAC address is xx:xx:23, the voice codec is G.711 with a period of 20 ms, and the transmission rate is 11 Mbps; in the STA24, the MAC address is xx:xx:24, the voice codec is G.729 with a period of 30 ms, and the transmission rate is 11 Mbps; and in the STA25, the MAC address is xx:xx:25, the voice codec is G.729 with a period of 30 ms, and the transmission rate is 11 Mbps. Note that in FIG. 18, only five wireless communication terminals are illustrated, but the number of wireless communication terminals may take any appropriate value. Further, each wireless communication terminal has the hardware configuration shown in FIG. 1 and the function block configuration shown in FIG. 2.

It is assumed that the AP3 and each wireless communication terminal communicate in the short preamble mode of IEEE802.11b. It is also assumed that the AP3 and each wireless communication terminal are packaged with IEEE802.11e EDCA and the aforementioned U-APSD.

Figure 19:
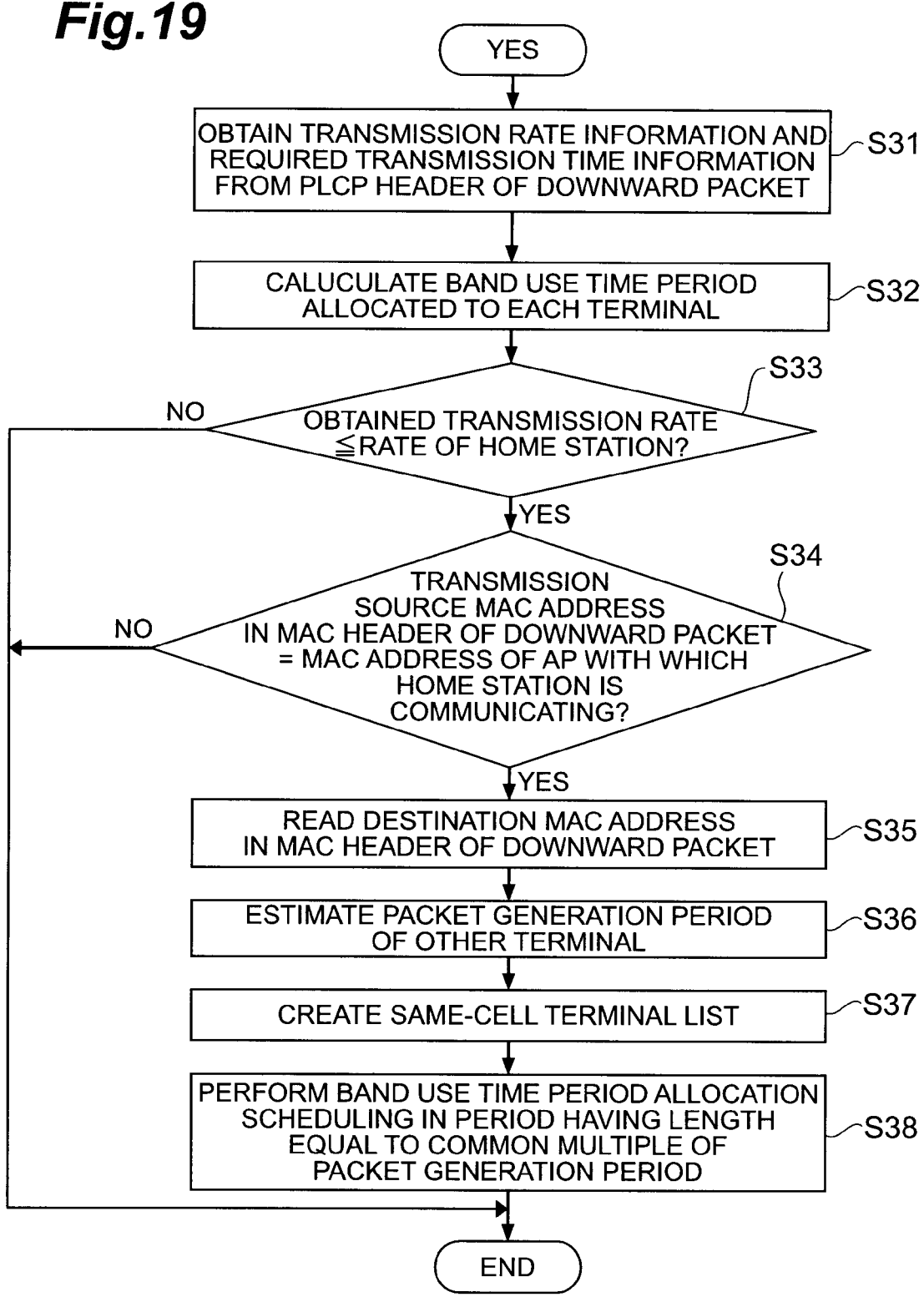
FIG. 19 is a flowchart of transmission scheduling processing, which is executed by each wireless communication terminal in the third embodiment.

An operation performed when each of the wireless communication terminals performs transmission scheduling in an autonomous distributed manner will now be described on the basis of FIG. 19. FIG. 19 shows a processing operation executed by each wireless communication terminal.

Each wireless communication terminal references the "SIGNAL" field and the "LENGTH" field in the PLCP header of a downward packet addressed to the home station and a downward packet addressed to another terminal from the AP3, the "SIGNAL" field describing the transmission rate of the packet and the "LENGTH" field describing the required transmission time for transmitting packets from the MAC header onward, and as a result obtains transmission rate information and required transmission time information (step S31 in FIG. 19).

Next, each wireless communication terminal calculates the band use time period allocated to itself in the following manner (step S32). In other words, a value obtained by adding the short preamble (72 µs), the Ack transmission time, and the transmission wait time for CSMA/CA to the transmission/reception time described in the LENGTH field is calculated as the time required to perform a transmission/reception procedure between the wireless communication terminal and the AP per packet. The AP3 and wireless communication terminals of this embodiment are packaged with U-APSD, and therefore an upward packet transmission/reception procedure and a downward packet transmission/reception procedure can be performed continuously. Hence, the time required to perform a transmission/reception procedure between the wireless communication terminal and the AP for one reciprocation of an upward VoIP packet and a downward VoIP packet is calculated to be twice the time required to perform a transmission/reception procedure per packet.

Here, each wireless communication terminal determines whether or not the obtained transmission rate is equal to or less than the transmission rate used by itself (step S33), and terminates the processing when the obtained transmission rate is higher than its own transmission rate. The reason for this is that information from the MAC header onward cannot be read physically in packets having a higher transmission rate than the transmission rate of the home station.

When the obtained transmission rate is determined to be equal to or lower than the transmission rate of the home station in the step S33, each wireless communication terminal references the information in the MAC header of the packet, and determines whether or not the transmission source address in the MAC header of the packet is the same as the MAC address of the AP with which it is communicating (step S34). Here, the processing is terminated when the addresses are not the same, but when the addresses are determined to be the same, each wireless communication terminal reads the destination MAC address in the MAC header of the packet (step S35). Thus, using the MAC address as an identifier, a wireless communication terminal existing within the same cell can be recognized.

Next, each wireless communication terminal estimates the packet generation period of the other terminals (step S36). In VoIP, which is used in this embodiment, the packet generation period is equal to the codec period. However, the codec type and codec period are not described in a voice packet that is exchanged between the AP2 and the wireless communication terminal, and therefore, to identify the codec period of another terminal, the codec period of the other terminal must be estimated. Any of the estimation methods described in the second embodiment may be employed as a method of estimating the codec period of another terminal. Note that the other terminal packet generation period estimation methods described above may be realized without differentiating between the terminals according to MAC address. Hence, even when a terminal having a higher transmission rate than the home station transmits and receives packets in a different packet generation period to the home station, the packet generation period of that terminal can be estimated.

Each wireless communication terminal then creates a same-cell terminal list such as those shown in FIGS. 20 and 21 using the packet generation periods obtained in the estimation process (step S37). The wireless communication terminals cannot recognize other terminals having a higher transmission rate than itself, and therefore the created same-cell terminal lists differ according to the wireless communication terminal. In this embodiment, the STA21 and 22 create the same-cell terminal list shown in FIG. 20, and the STA23, 24, 25 create the same-cell terminal list shown in FIG. 21.

Each wireless communication terminal then performs band use time period allocation scheduling using a period having a length equal to the common multiple of the packet generation period of each wireless communication terminal (step S38). In this embodiment, terminals having a packet generation period of 20 ms coexist with terminals having a packet generation period of 30 ms, and therefore scheduling is performed at a period having a length equal to the common multiple of 20 ms and 30 ms, i.e. 60 ms. Accordingly, in a scheduling period of 60 ms, three band use time periods are allocated to the 20 ms terminals (60 ms/20 ms=3), and two band use time periods are allocated to the 30 ms terminals (60 ms/30 ms=2). Hence, the number of allocated band use time periods differs according to the terminal, and therefore the band use time period cannot be allocated simply in order of the MAC address. Moreover, the band use time period must be allocated to terminals having a codec period of 20 ms at intervals as close to 20 ms as possible and to terminals having a codec period of 30 ms at intervals as close to 30 ms as possible. The reason for this is that in a real time application such as a voice application, delay fluctuation greatly affects quality.

Moreover, the STA21, 22 having a transmission rate of 5.5 Mbps cannot recognize the STA23, 24, 25 having a transmission rate of 11 bps. Therefore, similarly to the first embodiment, band use time period allocation must be performed in order from the terminal having the lowest transmission rate.

A scheduling procedure shown in FIG. 22, and a calculation procedure shown in FIG. 23, which is performed in each wireless communication terminal for calculating a schedule, will now be described.

Figure 23:
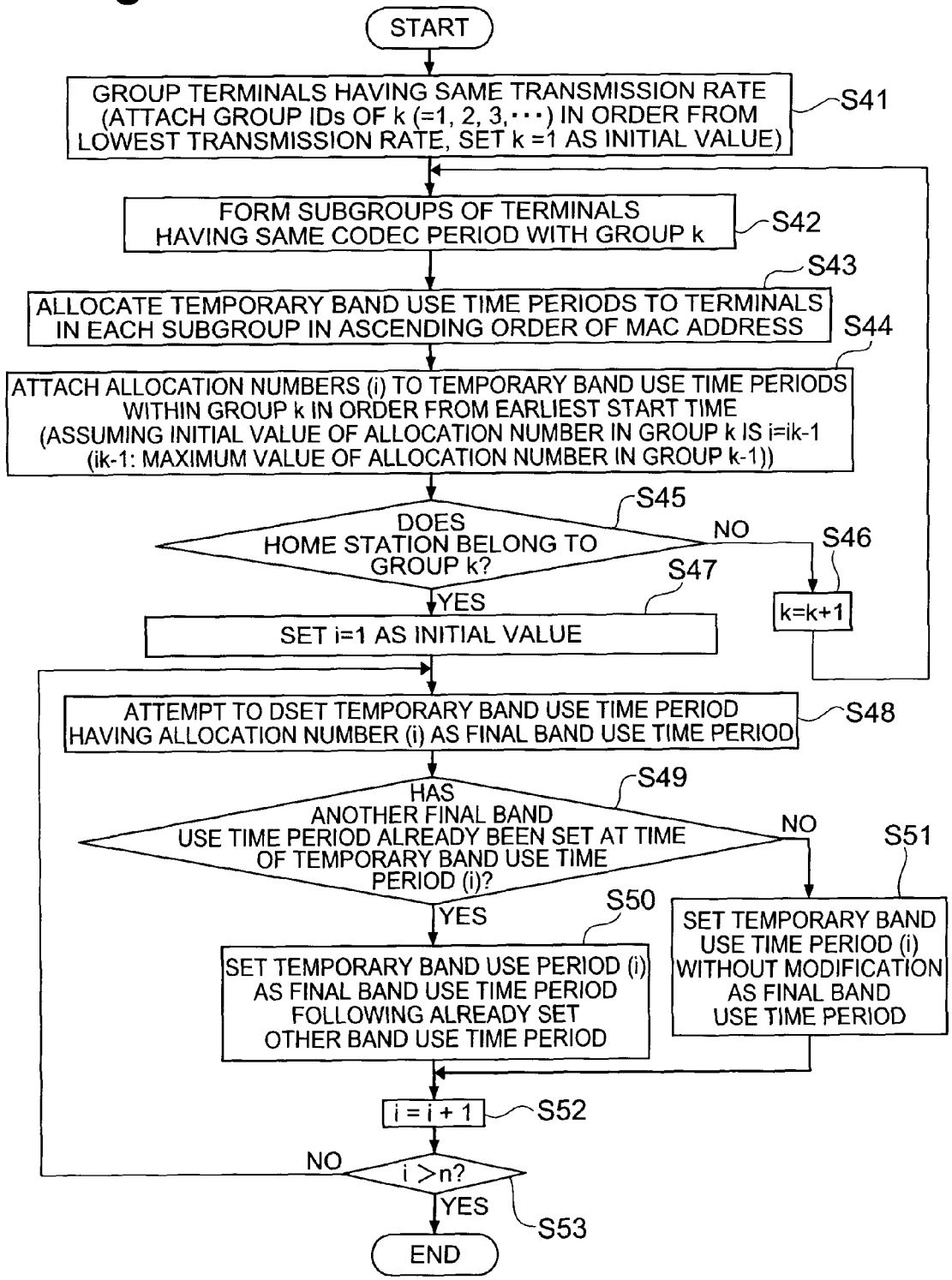
FIG. 23 is a view showing an allocation procedure performed by each wireless communication terminal in the third embodiment.

First, the wireless communication terminals form groups of terminals having the same transmission rate (step S41 in FIG. 23). At this time, the STA21, 22 do not group the terminals (STA23, 24, 25) having a higher transmission rate than themselves. Thus, a group ID of group 1 is attached to the STA21, 22 having a transmission rate of 5.5 Mbps, and a group ID of group 2 is attached to the STA23, 24, 25 having a transmission rate of 11 Mbps. Further, a variable k is set at an initial value of "1".

Next, subgroups of terminals having the same codec period are formed within a group k (step S42). Note that the variable k is incremented by 1 in a following step S46, and therefore subgrouping is performed in each group. In this embodiment, a total of four subgroups can be formed, namely a 5.5 Mbps, 20 ms period subgroup A comprising the STA21, a 5.5 Mbps, 30 ms period subgroup B comprising the STA22, an 11 Mbps, 20 ms period subgroup C comprising the STA23, and an 11 Mbps, 30 ms period subgroup D comprising the STA24 and the STA25.

Next, each wireless communication terminal within each subgroup is allocated a temporary band use time period in ascending order of the MAC address (step S43), and an allocation number (1), (2), . . . (n) is attached to each wireless communication terminal in the group k in order from the temporary band use time period having the earliest start time (step S44). The numbers shown in parentheses in FIG. 22 correspond to the allocation numbers. Note that here, allocation is performed in the group in ascending order of the MAC address, but any other appropriate method may be used. At this time, the common multiple of 60 ms is used as the schedule time period and the codec period interval is used as the temporary band use time period allocated to each terminal.

Next, a determination is made as to whether or not the home station belongs to the group k (step S45), and when the home station does not belong to the group k, the variable k is incremented by 1 (step S46), whereupon the processing of the steps S42 to S45 is executed again. When it is determined that the home station does belong to the group k, the routine advances to a step S47 to be described below.

Figure 22:
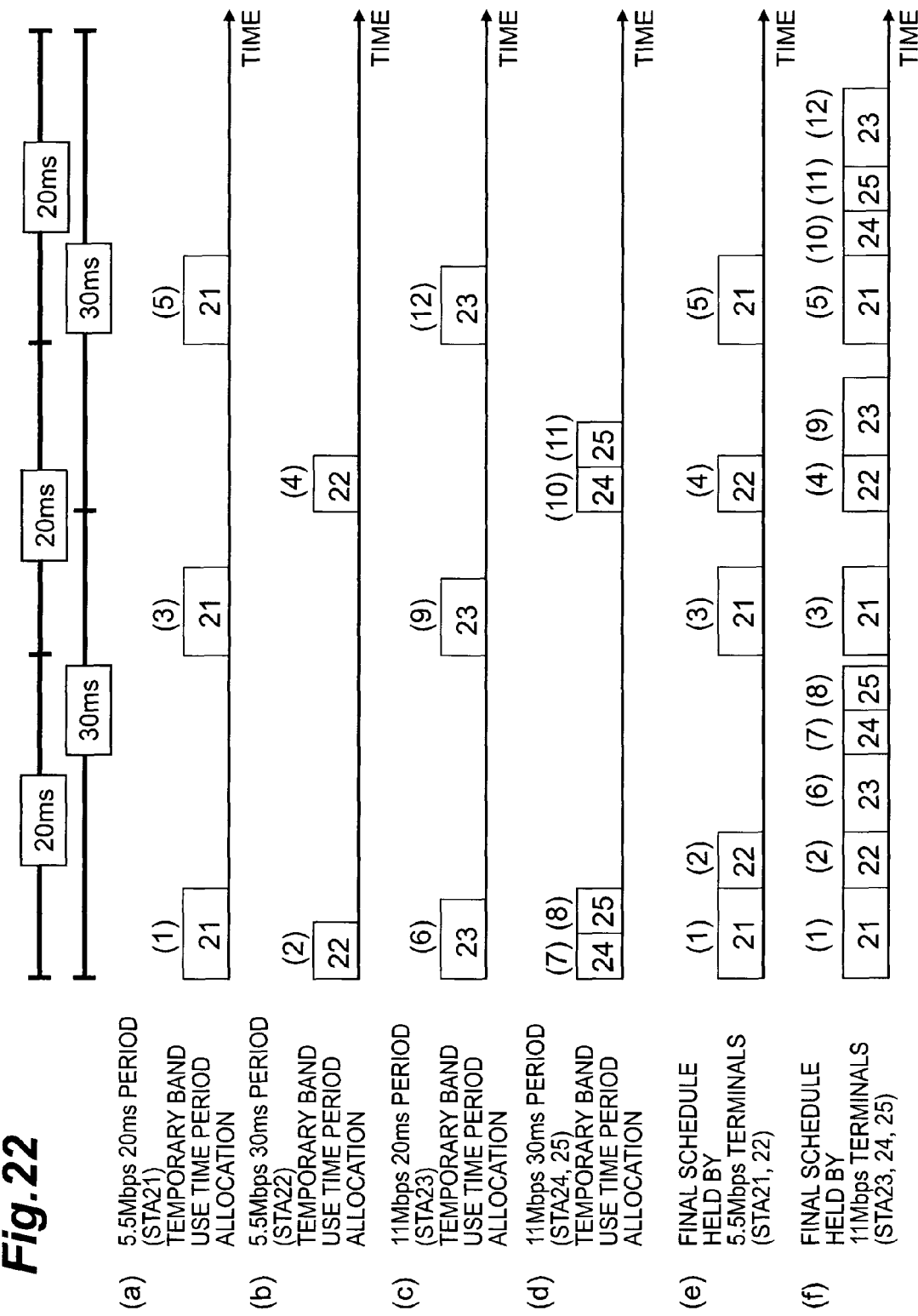
FIG. 22 is a view illustrating an allocation scheduling procedure with respect to each wireless communication terminal in the third embodiment.

Thus, temporary band use time periods are allocated to the subgroup A comprising the STA21, the subgroup B comprising the STA22, the subgroup C comprising the STA23, and the subgroup D comprising the STA24 and 25 as shown in (a), (b), (c) and (d) of FIG. 22, respectively. The scheduling for allocating the temporary band use time periods is ideal scheduling in which the band use time periods are set such that delay fluctuation does not occur relative to the packet generation period.

In actuality, however, a total of two groups, namely the group 1 comprising the STA21 and 22 and the group 2 comprising the STA23, 24 and 25, coexist, and therefore the times of the band use time periods overlap between the groups. Hence, the temporary band use time period allocation scheduling must be shifted to final band use time period allocation scheduling to ensure that delay fluctuation in each terminal is as impartial as possible and occurs as little as possible. For this purpose, the wireless communication terminals set the temporary band use time periods to final band use time periods in order of the allocation number in the manner described below.

First, a variable i is set to "1", which serves as an initial value (step S47). An attempt is then made to set the temporary band use time period having the allocation number (i) (referred to as "temporary band use time period (i)" hereafter) as a final band use time period (step S48). Here, a determination is made as to whether or not another final band use time period has already been set at the time of the temporary band use time period (i) (step S49).

When another final band use time period has already been set at the time of the temporary band use time period (i), the temporary band use time period (i) is set as a final band use time period at the end of the other band use time period that has already been set (step S50).

On the other hand, when another final band use time period has not yet been set at the time of the temporary band use time period (i) in the step S49, the temporary band use time period (i) is set without modification as the final band use time period (step S51).

The variable i is then incremented by 1 (step S52), whereupon the processing of the steps S48 to S52 is executed repeatedly on each temporary band use time period in order of allocation number until it is determined that the variable i has exceeded the tail end n of all of the allocation numbers.

More specifically, first, since the variable i is 1, the processing of the steps S48 to S52 is executed on the temporary band use time period having the allocation number (1). A negative determination is obtained initially in the step S49, and therefore, in the step S51, the temporary band use time period having the allocation number (1) is set without modification as the final band use time period, as shown in (a) of FIG. 22.

As shown in (a) and (b) of FIG. 22, the band use time period having the allocation number (1) has already been set at the same time as the temporary band use time period having the allocation number (2). Accordingly, an affirmative determination is obtained in the step S49, and in the step S50, the temporary band use time period having the allocation number (2) is set at the end of the band use time period having the allocation number (1). Thereafter, the processing of the steps S48 to S52 is executed in a similar sequence in relation to the temporary band use time periods having the allocation number (3) onward. When the processing has been performed on the band use time periods for all of the allocation numbers (i), an affirmative determination is obtained in the step S53, and therefore the processing of FIG. 23 is terminated.

Specifically, in the processing of FIG. 23 described above, allocation numbers are attached to each temporary band use time period in order from the earliest start time in group 1, as shown in (a) and (b) of FIG. 22. When allocation numbers have been attached to all of the temporary band use time periods in group 1, the 5.5 Mbps STA21, 22 cannot recognize the 11 Mbps group 2, and therefore the temporary band use time periods are set as final band use time periods in order of the allocation numbers up to this point. In this embodiment, the final band use time period allocation schedule held by the STA21 and 22 is set as shown in (e) of FIG. 22.

As regards the STA23, 24 and 25, on the other hand, once allocation numbers have been attached to the temporary band use time periods in group 1, allocation numbers are attached to the temporary band use time periods in group 2. Here, the allocation number of the last temporary band use time period in group 1 is 5, and therefore the allocation number attached to the temporary band use time period having the earliest start time in group 2 is 6, and subsequent allocation numbers are attached to the other temporary band use time periods. The temporary band use time periods are then set as final band use time periods in order of allocation number. The setting procedure is similar to that of the STA21, 22. In this embodiment, the final band use time period allocation schedule held by the STA23, 24 and 25 is set as shown in (f) of FIG. 22.

According to the processing of FIG. 23 described above, final schedules in which delay fluctuation is suppressed to the smallest amount possible, such as those shown in (e) and (f) of FIG. 22, can be set in an environment in which terminals having different codec periods coexist.

Figure 24:
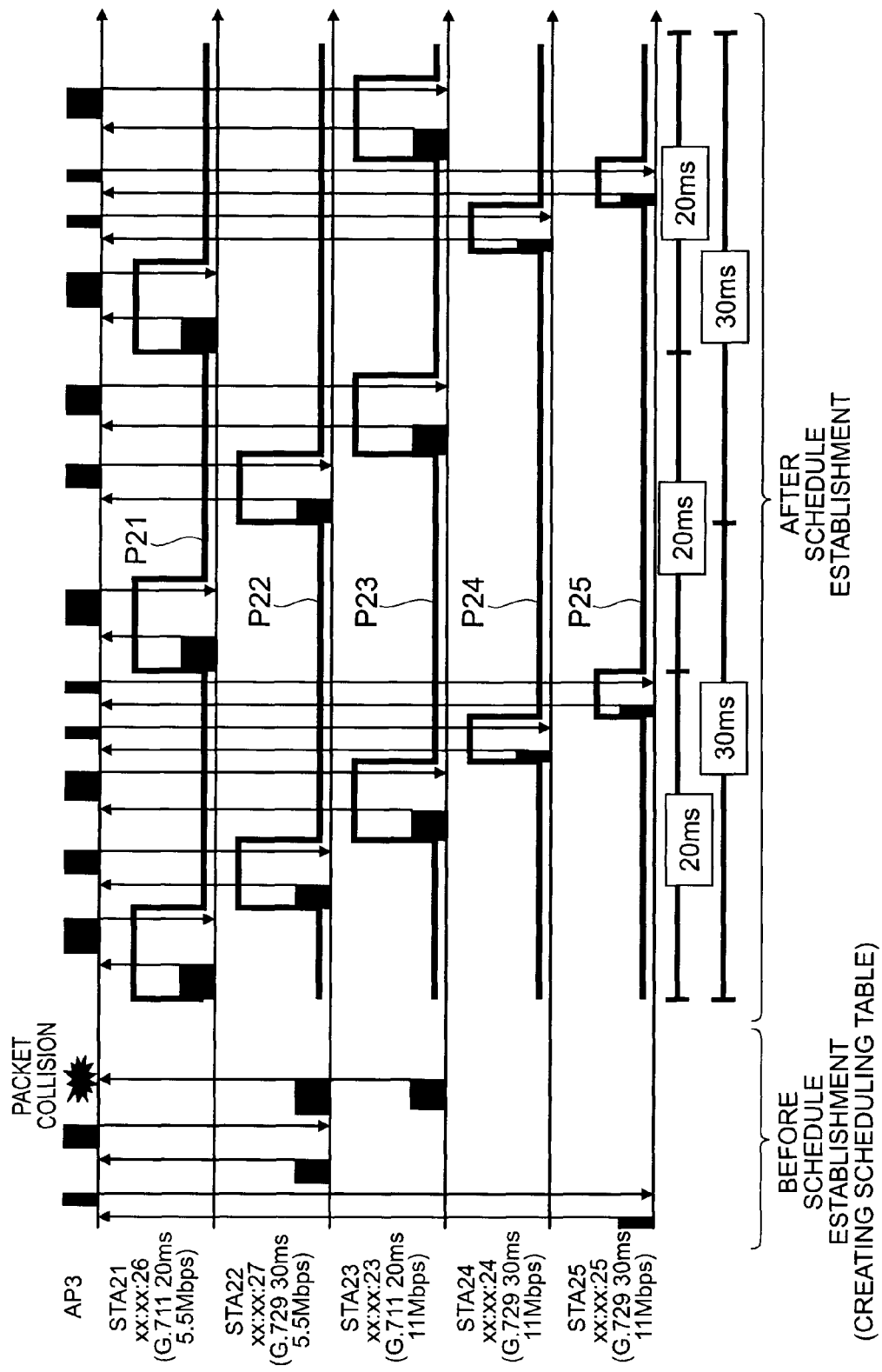
FIG. 24 is a view showing a sequence realized by the third embodiment.

By performing transmission scheduling in each wireless communication terminal in the manner described above, an organized sequence such as that shown in FIG. 24 can be realized. In addition to the sequence of packets transmitted and received between the wireless communication terminals and the AP, FIG. 24 shows transmission priorities, which vary chronologically in each terminal, on lines P21 to P25. In each terminal, the time period having an increased transmission priority (i.e. a high level) corresponds to the band use time period of the terminal. Thus, according to the third embodiment, scheduling avoiding packet collisions can be realized in an autonomous distributed manner even when wireless communication terminals having different transmission rates and different packet generation periods coexist.

Fourth Embodiment

Next, as the fourth embodiment, a case in which wireless communication terminals having different supportable modulation systems coexist will be described.

In the fourth embodiment, wireless communication terminals supporting IEEE802.11b (referred to hereafter as "IEEE802.11b terminals") and wireless communication terminals supporting IEEE802.11g (referred to hereafter as "IEEE802.11g terminals") coexist, and it is assumed that all terminals use the same voice codec. Note that IEEE802.11g includes a DSSS system, a CCK system, and a PBCC system as well as an OFDM system, but the systems (DSSS system, CCK system, PBCC system) other than the OFDM system are also supported by IEEE802.11b. Accordingly, packets of a system other than the OFDM system can be recognized by both the IEEE802.11b terminals and the IEEE802.11g terminals, and thus the transmission timing of the wireless communication terminals can be set in an autonomous distributed manner using a similar procedure to that of the first embodiment, whereby an improvement in communication quality can be achieved.

In the fourth embodiment to be described below, it is assumed that the IEEE802.11g terminals transmit and receive packets on the basis of the OFDM system. In this case, the IEEE802.11b terminals cannot recognize OFDM system packets, and only the IEEE802.11g terminals can recognize OFDM system packets. In this situation, the transmission timing of the wireless communication terminals can be set in an autonomous distributed manner using the following procedure, whereby an improvement in communication quality can be achieved.

Figure 25:
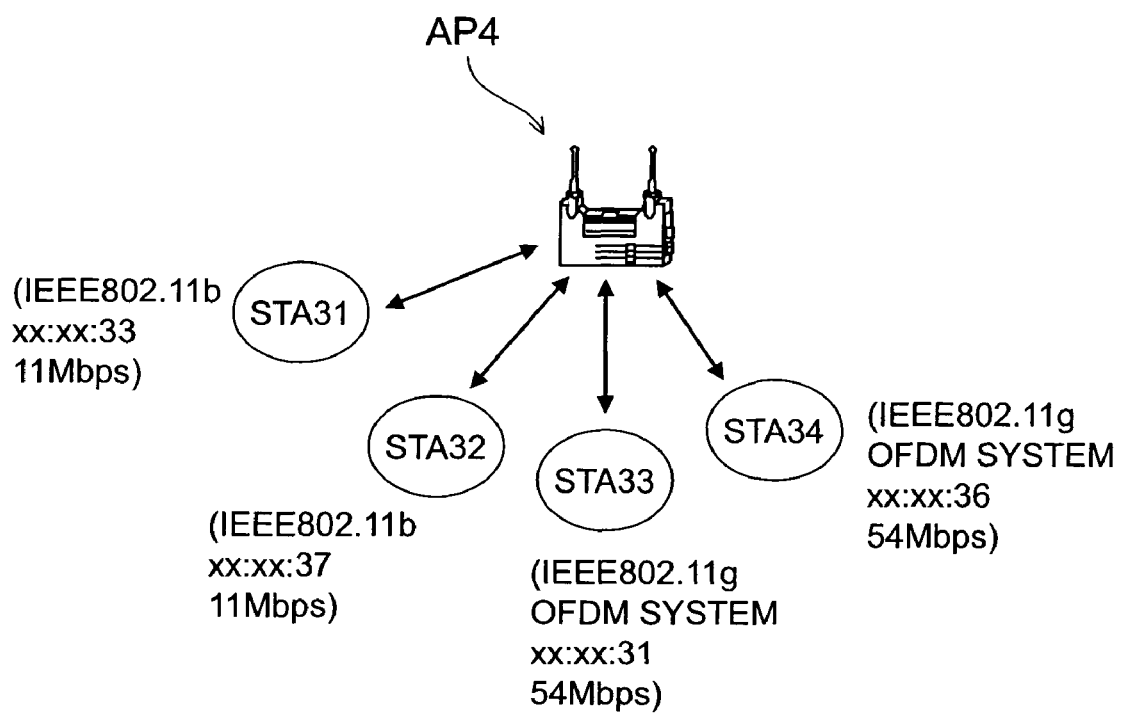
FIG. 25 is a view showing a network configuration of a fourth embodiment.

As shown in FIG. 25, a wireless LAN network is constituted by an AP4, serving as a single wireless base station, and a plurality of wireless communication terminals. Here, the plurality of wireless communication terminals are differentiated by the reference symbols STA31 to STA34. As shown in parentheses in FIG. 25, the modulation systems used during communication, MAC addresses, and transmission rates of the respective wireless communication terminals are as follows: in the STA31, the modulation system is IEEE802.11b, the MAC address is xx:xx:33, and the transmission rate is 11 Mbps; in the STA32, the modulation system is IEEE802.11b, the MAC address is xx:xx:37, and the transmission rate is 11 Mbps; in the STA33, the modulation system is the IEEE802.11g OFDM system, the MAC address is xx:xx:31, and the transmission rate is 54 Mbps; and in the STA34, the modulation system is the IEEE802.11g OFDM system, the MAC address is xx:xx:36, and the transmission rate is 54 Mbps. Note that in FIG. 25, only four wireless communication terminals are illustrated, but the number of wireless communication terminals may take any appropriate value. Further, each wireless communication terminal has the hardware configuration shown in FIG. 1 and the function block configuration shown in FIG. 2.

Further, the AP4 and each wireless communication terminal communicate in the short preamble mode of IEEE802.11b, and it is assumed that all of the wireless communication terminals perform VoIP communication at a codec period of 20 ms.

It is also assumed that the AP4 and each wireless communication terminal is packaged with IEEE802.11e EDCA and U-APSD (Unscheduled-Automatic Power Save Delivery). U-APSD is a protocol allowing the AP to transmit a downward packet to a wireless communication terminal upon reception of an upward packet from the terminal. Note that in this embodiment, the voice codec is G.711 and the codec period is 20 ms, but the type and period of the codec may be modified appropriately.

Figure 26:
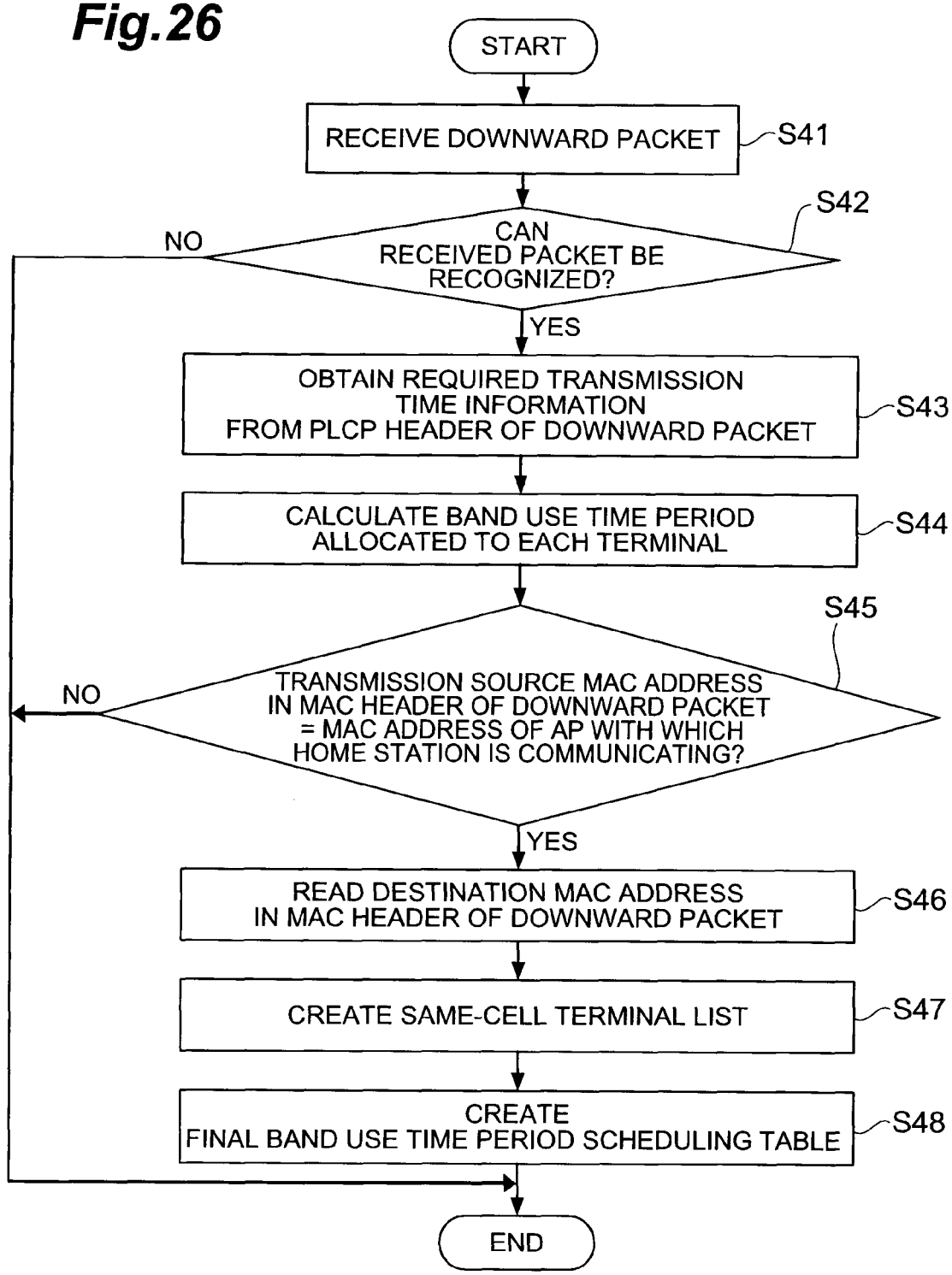
FIG. 26 is a flowchart of transmission scheduling processing, which is executed by each wireless communication terminal in the fourth embodiment.

An operation performed when each of the wireless communication terminals performs transmission scheduling in an autonomous distributed manner will now be described on the basis of FIG. 26. FIG. 26 shows a processing operation executed by each wireless communication terminal. Here, transmission scheduling is performed in 20 ms, i.e. the voice codec period. The reason for this is that the packet generation period is 20 ms, and therefore, by performing scheduling in 20 ms, the schedule may be repeated thereafter.

Each wireless communication terminal receives a downward packet (a downward packet addressed to the home station and a downward packet addressed to another terminal) from the AP4 (step S41 in FIG. 26).

At this time, the IEEE802.11b terminals cannot recognize an OFDM packet transmitted by the AP4 to the IEEE802.11g terminals, and therefore only packets addressed to IEEE802.11b terminals in the same cell can be recognized. In other words, the STA31 and the STA32 in FIG. 25 can only recognize packets addressed to the STA31 and 32. On the other hand, the IEEE802.11g terminals also support the IEEE802.11b modulation system, and can therefore recognize packets addressed to all of the terminals in the same cell. In other words, the STA33 and the STA34 in FIG. 25 can recognize all packets addressed to the STA31 to 34. Hence, the analysis unit 202 installed in each of the STA33 and 34 determines the modulation system from the received packet. At this time, the STA33 and the STA34 recognize that the modulation system of the STA31, 32 is IEEE802.11b (i.e. that the STA31 and 32 are IEEE802.11b terminals) from a packet addressed to the STA31 and a packet addressed to the STA32.

When the packet received in the step S41 cannot be recognized, the wireless communication terminals terminate the processing, and when the received packet can be recognized, the routine advances to a following step S43 (step S42).

In the step S42, each wireless communication terminal references the "LENGTH" field, which describes the required transmission time for transmitting packets from the MAC header onward, in the PLCP header of the received packet, and as a result obtains the required transmission time information (step S43).

Next, each wireless communication terminal calculates the band use time period allocated to itself in the following manner (step S44). In other words, a value obtained by adding the short preamble (72 μs), the Ack transmission time, and the transmission wait time for CSMA/CA to the transmission/reception time described in the LENGTH field of the downward packet is calculated as the time required to perform a transmission/reception procedure between the wireless communication terminal and the AP per packet. The AP4 and wireless communication terminals of this embodiment are packaged with U-APSD, and therefore an upward packet transmission/reception procedure and a downward packet transmission/reception procedure can be performed continuously. Hence, the time required to perform a transmission/reception procedure between the wireless communication terminal and the AP for one reciprocation of an upward VoIP packet and a downward VoIP packet is calculated to be twice the time required to perform a transmission/reception procedure per packet.

Each wireless communication terminal references the information in the MAC header of the downward packet, and determines whether or not the transmission source address in the MAC header of the downward packet is the same as the MAC address of the AP with which it is communicating (step S45). Here, the processing is terminated when the addresses are not the same, but when the addresses are determined to be the same, each wireless communication terminal reads the destination MAC address in the MAC header of the downward packet (step S46). Thus, using the MAC address as an identifier, a wireless communication terminal existing within the same cell can be recognized.

Then, on the basis of the information obtained in the recognition process described above, each wireless communication terminal creates a same-cell terminal list, which is a list of wireless communication terminals existing within the same cell (step S47). Note, however, that the IEEE802.11b terminals cannot recognize a terminal that is communicating through IEEE802.11g, and therefore, in this embodiment, the same-cell terminal list held by the STA31 and 32 is as shown in FIG. 27, and the same-cell terminal list held by the STA33 and 34 is as shown in FIG. 28. Thus, the held same-cell terminal list differs according to the wireless communication terminal.

After creating the same-cell terminal list, each wireless communication terminal creates a final band use time period scheduling table by arranging the terminals in the same-cell terminal list in order of the IEEE802.11b terminals first and the IEEE802.11g terminals next, and in ascending order of the MAC address in relation to terminals using the same modulation system (step S48). In this embodiment, the scheduling table created by the STA31 and 32 is as shown in FIG. 29, and the scheduling table created by the STA33 and 34 is as shown in FIG. 30.

In the tables shown in FIGS. 29 and 30, the "band use start time" is a relative time notation having zero as the start time of a predetermined schedule period, and the band use start time is calculated from the band use time period noted in the terminal list.

For example, the band use start time 1440 μs of the STA32 having the MAC address xx:xx:037 is calculated from the fact that the band use time period of the STA31 having the MAC address xx:xx:33 is 1440 μs. Further, the band use start time 2880 μs of the STA33 having the MAC address xx:xx:31 is calculated as 2880 μs (=1440+1440) by adding the band use time period 1440 μs of the STA32 to the band use start time 1440 μs of the STA32. Further, the band use start time 3748 μs of the STA34 having the MAC address xx:xx:36 is calculated as 3748 μs (=2880+868) by adding the band use time period 868 μs of the STA33 to the band use start time 2880 μs of the STA33.

Allocating the band use time period in order of the IEEE802.11b terminals first and the IEEE802.11g terminals next has the following advantages. For example, in this embodiment, the STA31, 32, which are IEEE802.11b terminals, cannot recognize the number of terminals communicating through the IEEE802.11g OFDM system. However, the terminals STA33, STA34, which communicate through the IEEE802.11g OFDM system, can recognize the existence of the STA31, 32, which communicate through IEEE802.11b. Hence, by determining the convention of allocating the band use time periods in order of the IEEE802.11b terminals first and the IEEE802.11g terminals next in advance, the STA33 and the STA34 can set their own band use time periods at the end of the band use time periods set for the STA31, 32. On the other hand, when an attempt is made to set the band use time periods in order of the terminals communicating through the IEEE802.11g OFDM system first, the IEEE802.11b terminals STA31 and STA32 do not know the number of terminals communicating through the IEEE802.11g OFDM system and cannot therefore calculate the start time of their own band use time periods without overlapping the band use time period of another terminal.

By performing transmission scheduling in each wireless communication terminal in the manner described above, an organized sequence such as that shown in FIG. 31 can be realized. In addition to the sequence of packets transmitted and received between the wireless communication terminals and the AP, FIG. 31 shows transmission priorities, which vary chronologically in each terminal, on lines P31 to P34. In each terminal, the time period having an increased transmission priority (i.e. a high level) corresponds to the band use time period of the terminal.

According to the fourth embodiment described above, scheduling avoiding packet collisions can be realized in an autonomous distributed manner even when wireless communication terminals having different modulation systems coexist. Note that the method of the fourth embodiment may be combined with the method of any of the first through third embodiments described above. For example, by combining the method of the fourth embodiment with the method of the first embodiment, it is possible to respond to a case in which wireless communication terminals having different transmission rates and different modulation systems coexist, and by combining the method of the fourth embodiment with the method of the second embodiment, it is possible to respond to a case in which wireless communication terminals having different voice codecs and different modulation systems coexist. By combining the method of the fourth embodiment with the method of the third embodiment, it is possible to respond to a case in which wireless communication terminals having different transmission rates, voice codecs, and modulation systems coexist.

In the first through fourth embodiments, each wireless communication terminal calculates a band use time period schedule, but the AP (i.e. the wireless base station) may calculate a schedule and notify each terminal of the schedule by transmitting a beacon or the like or by means of broadcasting.

The disclosure of Japanese Patent Application No. 2006-224501 filed Aug. 21, 2006 including specification, drawings and claims and the disclosure of Japanese Patent Application No. 2007-148491 filed Jun. 4, 2007 including specification, drawings and claims are incorporated herein by reference in its entirety.

What is claimed is:

1. A wireless communication terminal provided in a wireless system in which periodically generated packets are transmitted and received between a single wireless base station and a plurality of wireless communication terminals at different transmission rates, which performs packet transmission based on a packet transmission system in which wireless band allocation is performed through virtual carrier sensing, the wireless communication terminal comprising:
   a packet receiving module configured to receive a packet from said wireless base station;
   a first information obtaining module configured to analyze said packet received by said packet receiving module, configured to obtain transmission rate information described in said packet, and configured to obtain required transmission time information required to transmit said packet, which is described in said packet;
   a time calculating module configured to calculate a time required to perform a packet transmission/reception procedure on the basis of said required transmission time information obtained by said first information obtaining module;
   a first other terminal recognizing module configured to determine whether or not said transmission rate obtained by said first information obtaining module is equal to or lower than a transmission rate used by said wireless communication terminal, and configured to recognize the existence of an other terminal by decoding a destination Medium Access Control (MAC) address described in said packet when said obtained transmission rate is equal to or lower than said transmission rate used by said wireless communication terminal; and
   a first scheduling module configured to set a band use time period that is equal to or greater than said calculated time required to perform said packet transmission/reception procedure, for a time period, within a predetermined period corresponding to a packet generation period, in which a band use time period has not yet been set, regarding said other terminal recognized by said first other terminal recognizing module and said wireless communication terminal, in order from said other terminal or said wireless communication terminal having the lowest transmission rate.

2. A wireless communication terminal provided in a wireless system in which packets generated in different periods are transmitted and received between a single wireless base station and a plurality of wireless communication terminals, which performs packet transmission based on a packet transmission system in which wireless band allocation is performed through virtual carrier sensing, the wireless communication terminal comprising:
   a packet receiving module configured to receive a packet from said wireless base station;
   an information obtaining module configured to analyze said packet received by said packet receiving module and configured to obtain required transmission time information required to transmit said packet, which is described in said packet;
   a time calculating module configured to calculate a time required to perform a packet transmission/reception procedure on the basis of said required transmission time information obtained by said information obtaining module;
   an other terminal recognizing module configured to recognize the existence of an other terminal by decoding a destination Medium Access Control (MAC) address described in said packet;
   a packet generation period estimating module configured to estimate a packet generation period of said other terminal recognized by said other terminal recognizing module; and
   a scheduling module configured to (1) set a common multiple of said packet generation period of said other terminal estimated by said packet generation period estimating module and a packet generation period of said wireless communication terminal, as a scheduling period, and (2) set a band use time period that is equal to or greater than said calculated time required to perform said packet transmission/reception procedure, for a time period, within said scheduling period, in which a band use time period has not yet been set, regarding each of said other terminal and said wireless communication terminal.

3. The wireless communication terminal according to claim 2, wherein said packet generation period estimating module is configured to estimate said packet generation period of said other terminal by (1) receiving packets from said wireless base station for a predetermined amount of time, (2) decoding destination MAC addresses described in said received packets, and (3) observing the packet generation period of packets having an identical destination MAC address.

4. The wireless communication terminal according to claim 2, wherein said information obtaining module is configured to obtain transmission rate information described in said packet, and
   said packet generation period estimating module is configured to
      hold in advance a table describing a relationship between (1) codec types and periods and (2) packet lengths when packets are generated using said codec,
      calculate a packet length on the basis of said required transmission time information and said transmission rate information obtained by said information obtaining module, and
      determine a codec period of said other terminal by referring to said table using said calculated packet length as a key, and estimate said packet generation period based on said codec period.

5. The wireless communication terminal according to claim 2, wherein said packet generation period estimating module is configured to
   broadcast a packet describing a codec period used by said wireless communication terminal or said packet generation period of said wireless communication terminal, and
   estimate said packet generation period of said other terminal by receiving and decoding a packet broadcasted by said other terminal.

6. The wireless communication terminal according to claim 5, wherein each of the plurality of wireless communication terminals includes a packet generation period estimating module, and the plurality of wireless communication terminals having an identical packet length are grouped together, and
   the packet generation period estimating module of only one predetermined wireless communication terminal within each group of wireless communication terminals is configured to broadcast said packet describing said codec period used by said wireless communication terminal or said packet generation period of said wireless communication terminal.

7. The wireless communication terminal according to claim 2, wherein said scheduling module is configured to
group together terminals having an identical packet generation period from among said packet generation period of said other terminal estimated by said packet generation period estimating module and said packet generation period of said wireless communication terminal,
set a temporary band use time period in order of MAC address for each terminal in each group, by setting said temporary band use time period of each terminal as to be longer than or equal to said time required to perform said packet transmission/reception procedure calculated by a time calculating module of each terminal, and
set all of said temporary band use time periods in all of said groups as final band use time periods for all of said terminals in order from the temporary band use time period having the earliest start time, and when an attempt is made to set a temporary band use time period at a time in which another band use time period has already been set, set said temporary band use time period as a final band use time period at the end of said other band use time period.

8. A wireless communication terminal provided in a wireless system in which packets generated in different periods are transmitted and received between a single wireless base station and a plurality of wireless communication terminals at different transmission rates, which performs packet transmission based on a packet transmission system in which wireless band allocation is performed through virtual carrier sensing, the wireless communication terminal comprising:
a packet receiving module configured to receive a packet from said wireless base station;
a first information obtaining module configured to analyze said packet received by said packet receiving module, configured to obtain transmission rate information described in said packet, and configured to obtain required transmission time information required to transmit said packet, which is described in said packet;
a time calculating module configured to calculate a time required to perform a packet transmission/reception procedure on the basis of said required transmission time information obtained by said first information obtaining module;
a first other terminal recognizing module configured to determine whether or not said transmission rate obtained by said first information obtaining module is equal to or lower than a transmission rate used by said wireless communication terminal, and recognizing the existence of an other terminal by decoding a destination Medium Access Control (MAC) address described in said packet when said obtained transmission rate is equal to or lower than said transmission rate used by said wireless communication terminal;
a packet generation period estimating module for estimating a packet generation period of said other terminal recognized by said first other terminal recognizing module; and
a scheduling module configured to (1) set a common multiple of said packet generation period of said other terminal estimated by said packet generation period estimating module and a packet generation period of said wireless communication terminal, as a scheduling period, and (2) set a band use time period that is equal to or greater than said calculated time required to perform said packet transmission/reception procedure, for a time period, within said scheduling period, in which a band use time period has not yet been set, regarding each of said other terminal and said wireless communication terminal, in order from said other terminal or said wireless communication terminal having the lowest transmission rate.

9. A wireless communication terminal that performs packet transmission based on a packet transmission system in which wireless band allocation is performed through virtual carrier sensing in a wireless system in which packets are transmitted and received between a single wireless base station and a plurality of wireless communication terminals, said plurality of wireless communication terminals including a first wireless communication terminal capable of supporting only a first modulation system and a second wireless communication terminal capable of supporting said first modulation system and a second modulation system which is different from said first modulation system, said wireless communication terminal comprising:
a packet receiving module configured to receive a packet from said wireless base station;
an information obtaining module configured to analyze said packet received by said packet receiving module and configured to obtain required transmission time information required to transmit said packet which is described in said packet, when said packet is based on a modulation system that is supported by said wireless communication terminal;
a time calculating module configured to calculate a time required to perform a packet transmission/reception procedure on the basis of said required transmission time information obtained by said information obtaining module;
an other terminal recognizing module configured to, when said received packet is based on said modulation system that is supported by said wireless communication terminal and said received packet is recognized, recognize the existence of an other terminal capable of supporting an identical modulation system to said modulation system that is supported by said wireless communication terminal, by decoding a destination Medium Access Control (MAC) address described in said packet; and
a scheduling module configured to set a band use time period that is equal to or greater than said calculated time required to perform said packet transmission/reception procedure, for a time period in which a band use time period has not yet been set, regarding said other terminal recognized by said other terminal recognizing module and said wireless communication terminal, in order of said first wireless communication terminal and then said second wireless communication terminal.

10. A wireless communication method executed by a wireless communication terminal provided in a wireless system in which periodically generated packets are transmitted and received between a single wireless base station and a plurality of wireless communication terminals at different transmission rates, said wireless communication terminal performing packet transmission based on a packet transmission system in which wireless band allocation is performed through virtual carrier sensing, said wireless communication method comprising:
a packet receiving step in which a packet receiving module receives a packet from said wireless base station;
a first information obtaining step in which a first information obtaining module analyzes said packet received in said packet receiving step, obtains transmission rate information described in said packet, and obtains required transmission time information required to transmit said packet, which is described in said packet;

a time calculating step in which a time calculating module calculates a time required to perform a packet transmission/reception procedure on the basis of said required transmission time information obtained in said first information obtaining step;

a first other terminal recognizing step in which a first other terminal recognizing module determines whether or not said transmission rate obtained in said first information obtaining step is equal to or lower than a transmission rate used by said wireless communication terminal, and recognizes an existence of an other terminal by decoding a destination Medium Access Control (MAC) address described in said packet when said obtained transmission rate is equal to or lower than said transmission rate used by said wireless communication terminal; and a first scheduling step in which a first scheduling module sets a band use time period that is equal to or greater than said calculated time required to perform said packet transmission/reception procedure, for a time period, within a predetermined period corresponding to a packet generation period, in which a band use time period has not yet been set, regarding said other terminal recognized in said first other terminal recognizing step and said wireless communication terminal, in order from said other terminal or said wireless communication terminal having the lowest transmission rate.

11. A wireless communication method executed by a wireless communication terminal provided in a wireless system in which packets generated in different periods are transmitted and received between a single wireless base station and a plurality of wireless communication terminals, said wireless communication terminal performing packet transmission based on a packet transmission system in which wireless band allocation is performed through virtual carrier sensing, said wireless communication method comprising:

a packet receiving step in which a packet receiving module receives a packet from said wireless base station;

an information obtaining step in which an information obtaining module analyzes said packet received in said packet receiving step and obtains required transmission time information required to transmit said packet, which is described in said packet;

a time calculating step in which a time calculating module calculates a time required to perform a packet transmission/reception procedure on the basis of said required transmission time information obtained in said information obtaining step;

an other terminal recognizing step in which an other terminal recognizing module recognizes an existence of an other terminal by decoding a destination Medium Access Control (MAC) address described in said packet;

a packet generation period estimating step in which a packet generation period estimating module estimates a packet generation period of said other terminal recognized in said other terminal recognizing step; and a scheduling step in which a scheduling module (1) sets a common multiple of said packet generation period of said other terminal estimated in said packet generation period estimating step and a packet generation period of said wireless communication terminal, as a scheduling period, and (2) sets a band use time period that is equal to or greater than said calculated time required to perform said packet transmission/reception procedure, for a time period, within said scheduling period, in which a band use time period has not yet been set, regarding each of said other terminal and said wireless communication terminal.

12. A wireless communication method executed by a wireless communication terminal provided in a wireless system in which packets generated in different periods are transmitted and received between a single wireless base station and a plurality of wireless communication terminals at different transmission rates, said wireless communication terminal performing packet transmission based on a packet transmission system in which wireless band allocation is performed through virtual carrier sensing, said wireless communication method comprising:

a packet receiving step in which a packet receiving module receives a packet from said wireless base station;

a first information obtaining step in which a first information obtaining module analyzes said packet received in said packet receiving step, obtains transmission rate information described in said packet, and obtains required transmission time information required to transmit said packet, which is described in said packet;

a time calculating step in which a time calculating module calculates a time required to perform a packet transmission/reception procedure on the basis of said required transmission time information obtained in said first information obtaining step;

a first other terminal recognizing step in which a first other terminal recognizing module determines whether or not said transmission rate obtained in said first information obtaining step is equal to or lower than a transmission rate used by said wireless communication terminal, and recognizes the existence of an other terminal by decoding a destination Medium Access Control (MAC) address described in said packet when said obtained transmission rate is equal to or lower than said transmission rate used by said wireless communication terminal;

a packet generation period estimating step in which a packet generation period estimating module estimates a packet generation period of said other terminal recognized in said first other terminal recognizing step; and a scheduling step in which a scheduling module (1) sets a common multiple of said packet generation period of said other terminal estimated in said packet generation period estimating step and a packet generation period of said wireless communication terminal, as a scheduling period, and (2) sets a band use time period that is equal to or greater than said calculated time required to perform said packet transmission/reception procedure, for a time period, within said scheduling period, in which a band use time period has not yet been set, regarding each of said other terminal and said wireless communication terminal, in order from said other terminal or said wireless communication terminal having the lowest transmission rate.

13. A wireless communication method executed by a wireless communication terminal that performs packet transmission based on a packet transmission system in which wireless band allocation is performed through virtual carrier sensing in a wireless system in which packets are transmitted and received between a single wireless base station and a plurality of wireless communication terminals, said plurality of wireless communication terminals including a first wireless communication terminal capable of supporting only a first modulation system and a second wireless communication terminal capable of supporting said first modulation system and a second modulation system which is different from said first modulation system, said wireless communication method comprising:
- a packet receiving step in which a packet receiving module receives a packet from said wireless base station;
- an information obtaining step in which an information obtaining module analyzes said packet received in said packet receiving step and obtains required transmission time information required to transmit said packet which is described in said packet, when said packet is based on a modulation system that is supported by said wireless communication terminal and said packet is recognized;
- a time calculating step in which a time calculating module calculates a time required to perform a packet transmission/reception procedure on the basis of said required transmission time information obtained in said information obtaining step;
- an other terminal recognizing step in which an other terminal recognizing module recognizes an existence of an other terminal capable of supporting an identical modulation system to said modulation system that is supported by said wireless communication terminal, by decoding a destination Medium Access Control (MAC) address described in said received packet, when said packet is based on said modulation system that is supported by said wireless communication terminal and said received packet is recognized; and
- a scheduling step in which a scheduling module sets a band use time period that is equal to or greater than said calculated time required to perform said packet transmission/reception procedure, for a time period in which a band use time period has not yet been set, regarding said other terminal recognized in said other terminal recognizing step and said wireless communication terminal, in order of said first wireless communication terminal and then said second wireless communication terminal.

* * * * *